United States Patent [19]
Shodai et al.

[11] Patent Number: 5,834,139
[45] Date of Patent: Nov. 10, 1998

[54] NEGATIVE ELECTRODE MATERIAL FOR USE IN LITHIUM SECONDARY BATTERIES AND LITHIUM SECONDARY BATTERIES INCORPORATING THIS MATERIAL

[75] Inventors: Takahisa Shodai; Shigeto Okada; Shin-ichi Tobishima; Jun-ichi Yamaki, all of Mito, Japan

[73] Assignee: Nippon Telegraph and Telephone Corporation, Tokyo, Japan

[21] Appl. No.: 673,054

[22] Filed: Jul. 1, 1996

[30]     Foreign Application Priority Data

| Jul. 5, 1995 | [JP] | Japan | 7-192585 |
| Jul. 17, 1995 | [JP] | Japan | 7-202879 |
| Jul. 17, 1995 | [JP] | Japan | 7-202880 |
| Aug. 1, 1995 | [JP] | Japan | 7-215204 |

[51] Int. Cl.$^6$ ................................................. H01M 10/40
[52] U.S. Cl. ............................................ 429/197; 429/218
[58] Field of Search ................................. 429/218, 194, 429/197; 252/182.1

[56]              References Cited

U.S. PATENT DOCUMENTS 5,415,957   5/1995   Okada et al. .

FOREIGN PATENT DOCUMENTS

| 0 592 301 A1 | 10/1993 | European Pat. Off. . |
| 0 646 977 A2 | 9/1994 | European Pat. Off. . |
| 07078609 | 3/1995 | Japan . |
| 07320720 | 12/1995 | Japan . |
| 07335201 | 12/1995 | Japan . |

OTHER PUBLICATIONS

"Abstracts of the Sixty First Meeting of the Electrochemical Society (Japan)", p. 31, 1994 no month.
Nishijima et al., "Electrochemical Studies of a New Anode Material, Li$_3$M$_x$N (M=Co, Ni, Cu)," 8th International Meeting on Lithium Batteries, Jun. 16–21, 1996, pp. 402–403.

Shodai et al., "Anode Performance of a New Layered Nitride Li$_{3-x}$Co$_x$N (x=0.2–0.6)," 8th International Meeting on Lithium Batteries, Jun. 16–21, 1996, pp. 404–405.

Nishijima et al., "Synthesis and electrochemical studies of a new anode material, Li$_{3-x}$Co$_x$N," Solid State Ionics, vol. 83, No. 1,2, Jan. 1996, pp. 107–111.

Shodai et al., "Study of Li$_{3-x}$M$_x$N (M: Co, Ni or Cu) System for use as Anode Material in Lithium Rechargeable Cells," 10th International Conference on Solid State Ionics, Dec. 3–8, 1995, p. 193.

Shodai et al., "Study of high capacity anode materials for lithium rechargeable cells," The 36th Battery Symposium in Japan, Sep. 12–14, 1995, pp. 149–150.

Koike et al., "Aspects of Anode Materials for Lithium Secondary Battery," Oosaka Industrial Technology Research Institute Journal, vol. 45, No. 2, 1994, pp. 53–59.

Patent Abstracts of Japan, vol. 018, No. 252, May 13, 1994 & JP–A–06 03679, Feb. 10, 1994.

*Primary Examiner*—Anthony Skapars
*Attorney, Agent, or Firm*—Finnegan, Henderson, Farabow, Garrett & Dunner, L.L.P.

[57]              ABSTRACT

A negative electrode material for use in lithium secondary batteries contains a negative electrode active material container made from an amorphous transition metal nitride containing lithium represented by the chemical formula $Li_{1+x}M_yN$, where M represents one or more elements selected from; a transition metal, group IIIA, group IVA, and group VA, and contains at least a transition metal, x is within the range from −0.2 to 2.0, and y is within the range from 0.1 to 0.6.

14 Claims, 19 Drawing Sheets

NEGATIVE ELECTRODE MATERIAL FOR USE IN LITHIUM SECONDARY BATTERIES AND LITHIUM SECONDARY BATTERIES INCORPORATING THIS MATERIAL

BACKGROUND OF THE INVENTION

1. Field of the Invention

The present invention relates to lithium secondary batteries, negative electrode material for use in those batteries, and the methods of manufacture.

2. Background Art

Recently there has been progress with the miniaturization, weight reduction, and portability of electronic appliances, resulting in the requirement for development of secondary cells having a high energy density as the power source. As a secondary cell to meet this requirement a lithium secondary battery using a lithium metal as a negative electrode active material has been contemplated.

A lithium secondary battery basically has a higher voltage and a higher energy density than other types of conventional secondary batteries, for example nickel cadmium batteries or lead storage batteries.

However, in general with lithium secondary batteries using lithium metal as the negative electrode active material, needle-shaped lithium (dendrite) is produced during charging. Furthermore, during discharging the needle-shaped lithium collapses and dissociates from the electrode base. Hence lithium which does not contribute to the charging-discharging is produced. Moreover, since the dissociated metallic lithium particles are extremely active, the lithium metal is consumed by reaction with the electrolyte.

For these reasons, cells wherein lithium metal is used for the negative electrode active material have the inherent problem of a short cycle life. Hence in cell systems using lithium metal or lithium alloy for the negative electrode, there is the situation wherein it is difficult to maintain the cycle life.

Moreover, when lithium metal is used for the negative electrode, then theoretically the capacity per volume of negative electrode is around 2062 mAh/cm$^3$. However since the cell is generally provided with an amount of lithium to give approximately three times the cell capacity to compensate for the abovementioned deterioration in the metallic lithium, the capacity per volume of negative electrode becomes 687 mAh/cm$^3$.

Therefore, as a new negative electrode active material container, as a substitute for the lithium metal or lithium alloy, a material which utilizes a lithium intercalation reaction has gained attention. For this substitute material, a carbonaceous material such as natural graphite or synthetic graphite, or an inorganic material such as di-niobium-penta-oxide ($Nb_2O_5$), molybdenum dioxide ($MoO_2$), or titanium disulfide ($TiS_2$) have been investigated.

With these materials, since the lithium is retained in an ionized state within the skeletal structure, there is more stability than with the lithium negative electrode in a chemically active metal state. Moreover since there is no growth of dendrite as when lithium metal is used for the negative electrode active material, then the cycle life is improved.

Furthermore, with the construction wherein a carbonaceous material is used for the negative electrode active material container, a practical cell having a charge-discharge capacity of 150–370 mAh/g has been realized, wherein the lithium ions can be stably inserted and extracted in a low electrode potential range of 0–1 V relative to a lithium reference electrode (metallic lithium).

Incidentally, when a carbonaceous material is used for the negative electrode active material container, then if most of the lithium content is $LiC_6$, the capacity per mass is relatively large at 370 mAh/g. However, the specific gravity of the carbonaceous material is low at 1.6–2.2 g/cm$^3$, and if the electrode is made in sheet form, then this specific gravity reduces further to 1–1.5 g/cm$^3$. Therefore, the capacity per negative electrode volume reduces to 370–555 mAh/cm$^3$. This however is the theoretical value, and in practice is reduced even further to 200–370 mAh/cm$^3$.

Thus when a carbonaceous material is used for the negative electrode, the capacity ratio per negative electrode volume becomes approximately half of that for the abovementioned case with lithium metal. There is thus the problem that the energy density of a cell using a carbonaceous material for the negative electrode is quite small compared to that for a cell using lithium metal for the negative electrode.

Moreover, with the abovementioned inorganic materials such as di-niobium-penta-oxide, then in general the electrode potential at which the lithium ions can be stably inserted and extracted is high at 0.5–2.0 V relative to a lithium reference electrode. There is thus the problem when these inorganic materials are used for the negative electrode, in that the operating potential of the lithium secondary battery is reduced to 0.5–2.0 V, and hence a high voltage cannot be attained.

Also, since the charge-discharge capacity is small at 100–200 mAh/g, there is the problem that the energy density of a cell using an inorganic material for the negative electrode is quite small compared to a cell using lithium material for the negative electrode.

Furthermore, in order to achieve a high cell voltage and high energy density, then at low potentials of 0.0–1.5 V relative to a lithium reference electrode, the electrochemical reaction for insertion and extraction of the lithium ions must be reversible. However, when the inorganic material operates at low potentials of 0.0–1.5 V, the electrochemical reaction in the insertion and extraction of the lithium ions becomes non reversible, and the inorganic material is said to decompose. There is however practically no information of how the inorganic material operates at low potentials of 0.0–1.5 V relative to a lithium reference electrode.

It has been reported however (Abstracts of the Sixty First Meeting of the Electrochemical Society (Japan) p.31, 1994), that of the inorganic materials, a crystalline material having a composition of $Li_{2.5}Co_{0.5}N$, has a capacity ratio of 330 mAh/g at a potential close to 1 V relative to a lithium reference electrode.

However, with this crystalline $Li_{2.5}Co_{0.5}N$, lithium is only used in charging and discharging in a range from 0–0.755 Li/mol. Hence the capacity ratio is small at 330 mAh/g, and thus does not approach the theoretical capacity for carbonaceous materials. Moreover, since the specific gravity of the $Li_{2.5}Co_{0.5}N$ at around 2.3 g/cm$^3$ is somewhat higher than that of the carbonaceous materials, then the capacity per negative electrode volume remains at approximately the same as that for the carbonaceous material. Hence there is the problem that the energy density of a cell using $Li_{2.5}Co_{0.5}N$ for the negative electrode is also quite small compared to that for a cell wherein lithium metal is used for the negative electrode.

Furthermore, with the crystalline $Li_{2.5}Co_{0.5}N$, since the lithium is filled in the structure, then when this is used for the negative electrode of a lithium secondary battery, it is necessary to operate the cell so as to extract lithium ions from the negative electrode. That is, the cell must be operated from after discharging.

Incidentally, when a transition metal oxide containing lithium and having a high electrode potential relative to lithium metal of greater than 3 V is used for the positive electrode of a lithium secondary battery, it is necessary to operate the cell so as to extract lithium ions from the positive electrode. That is, the cell must be operated from after charging.

Consequently, it is not possible to assemble together a negative electrode made from crystalline $Li_{2.5}Co_{0.5}N$, with a positive electrode made from a transition metal oxide containing lithium and having such a high voltage. Therefore, when a negative electrode made from crystalline $Li_{2.5}Co_{0.5}N$ is used, there is the problem in that it is not possible to obtain both the high voltage and the high energy density.

SUMMARY OF THE INVENTION

The negative electrode material for use in lithium secondary batteries, of the present invention, contains a negative electrode active material container made from an amorphous transition metal nitride containing lithium represented by the chemical formula $Li_{1+x}M_yN$. Here M represents one or more elements selected from; a transition metal, group IIIA, group IVA, and group VA, and contains at least a transition metal, x is within the range from −0.2–2.0, and y is within the range from 0.1–0.6.

Moreover, the lithium secondary battery of the present invention is one which uses this novel negative electrode material.

With the lithium secondary battery of the present invention, the problems with the abovementioned conventional technology are overcome, giving a battery of high energy density with large charge-discharge capacity, and a long cycle life.

DESCRIPTION OF THE PREFERRED EMBODIMENTS

Figure 1:
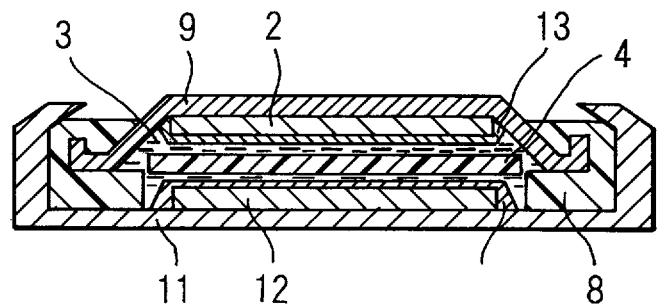
FIG. 1 is a cross-sectional view of an example of a lithium secondary battery.

With the negative electrode material of the present invention, an amorphous transition metal nitride containing lithium represented by the chemical formula Li$_{1+x}$M$_y$N (where M represents one or more elements selected from; a transition metal, group IIIA, group IVA, and group VA, and contains at least a transition metal, x is within the range from −0.2–2.0 and y is within the range from 0.1–0.6) is used for the negative electrode active material container. It is both novel and excellent.

Alternatively a negative electrode material having a negative electrode active material container made from an amorphous transition metal nitride containing lithium represented by the chemical formula Li$_{3-p-q}$M$_p$N is both novel and excellent. Here M is one or more elements selected from; a transition metal, group IIIA, group IVA, and group VA, and contains at least a transition metal, p is within the range from 0.1–1.0, and q is within the range from 0.8–1.8.

With the negative electrode active material container of the present invention, the lithium ions can be stably inserted and extracted in the region of low electrode potential below 1.5 V relative to a lithium reference electrode (metallic lithium), and thus has a high capacity charge-discharge range.

With the present invention, the transition metal represented by M or M' means an element in the periodic table; from Sc of atomic number 21 to Zn of atomic number 30, from Y of atomic number 39 to Cd of atomic number 48, or from La of atomic number 57 to Hg of atomic number 80. Moreover the group IIIA elements means the elements B, Al, Ga, In, Tl, the group IVA elements means the elements C, Si, Ge, Sn, Pb, and the group VA elements means the elements P, As, Sb, Bi. Consequently, LiMN (where M represents one or more elements selected from; a transition metal, group IIIA, group IVA, and group VA, and contains at least a transition metal) can be for example; LiCoN, LiNiN, LiCuN, LiCoFeN, LiCoNiN, LiCoCuN, LiNiCuN, LiCoAlN, LiCoGeN, or LiCoAsN.

With the Li$_{1+x}$M$_y$N, if x is less than −0.2, then the Li$_{1+x}$M$_y$N dissociates so that there is the possibility of being unable to effect charging-discharging. Moreover, if x is greater than 2.0, then the capacity of a cell using this as the negative electrode material drops. It is thus preferable for x to be within the range of −0.2–0.5, and ideally to be zero.

Moreover, if y is less than 0.1 the insulation properties increase, thus degrading the cell performance of a cell using this for the negative electrode material, and giving rise to the possibility of dissociation of the Li$_{1+x}$M$_y$N. On the other hand, if y is greater than 0.6, the solid-solubility of the transition metal element becomes difficult. It is thus more preferable for y to be less than 0.5.

The compound represented by the chemical formula Li$_{1+x}$M$_y$N (−0.2≦x≦2.0, 0.1≦y≦0.6) or Li$_{3-p-q}$M$_p$N (0.1≦p≦1.0, 0.8≦q≦1.8), for example; Li$_{1+x}$Co$_y$N, Li$_{1+x}$Ni$_y$N, or Li$_{1+x}$Cu$_y$N; or Li$_{1+x}$Co$_{y'}$Ni$_{y''}$N, Li$_{1+x}$Co$_{y'}$Cu$_{y''}$N, or Li$_{1+x}$Ni$_{y'}$Cu$_{y''}$N (where 0.1≦y'+y" (=y)≦0.6), being the negative electrode active material container of the present invention, is heretofore unknown, and exists in a new phase (referred to hereunder as a γ phase). This γ phase is one in which the lithium ions exist in a dissociated condition. In X-ray powder diffraction measurements with θ as an angle of diffraction, it has no diffraction peak within a range from 30° to 70° with 2θ, and is thus amorphous.

This γ phase allows the reversible extraction and insertion of the lithium ions, as well as having a high charge-discharge capacity. As described later, the amorphous Li$_{1+x}$M$_y$N of the present invention is obtained by extracting the lithium ions from a transition metal nitride containing lithium, or by forming a thin film. Such a once amorphized Li$_{1+x}$M$_y$N cannot be subsequently crystallized, even if a quantity containing lithium ions is added, and thus continues to retain the amorphous condition. Consequently, the Li$_{1+x}$M$_y$N of the present invention made by passing once thorough an amorphizing process has a completely different structure from a transition metal nitride containing crystalline lithium, even if it can be represented by the same chemical formula, for example crystalline Li$_{2.5-x}$Co$_{0.5}$N (0≦x≦0.755), and has completely different characteristics on a macro scale.

With the present invention, the charge-discharge capacity is remarkably increased by using the γ phase having a high charge-discharge capacity, for charging-discharging. That is to say, in X-ray powder diffraction measurements with an angle of diffraction of 2θ, it has no diffraction peak from 30° to 70°, and is thus amorphous. Hence cell performance is improved.

With the negative electrode active material container in the present invention, the charge-discharge capacity is large, and the specific gravity is the same as or higher than that of carbonaceous materials. Hence the charge-discharge capacity per negative electrode unit volume is also greater than that for the carbonaceous materials heretofore used for the negative electrode active material container.

Moreover, with the negative electrode active material container in the present invention, since lithium diffusion is fast and polarization due to charging-discharging is minimal, then charging-discharging at high currents is possible.

Also, high voltage, high energy density can be achieved without a marked drop in cell operating voltage.

Furthermore, since a sudden drop in capacity due to repeated charging-discharging is not observed, then an very long cycle life can be obtained. Moreover, since deposits of lithium metal or dendrite growth is not observed on the electrode surface of the negative electrode active material container with repeated charging-discharging, then the cycle life can be lengthened.

Consequently, by using the amorphous transition metal nitride containing lithium of the present invention as the negative electrode active material container, then a lithium secondary battery with high energy density, a large charge discharge capacity, and a long cycle life can be realized.

Moreover, a transition metal nitride containing lithium represented by the chemical formula Li$_{1+x}$M$_y$N (where M is one or more elements selected from; a transition metal, group IIIA, group IVA, and group VA, and contains at least a transition metal, x is within the range from −0.2–2.0, and y is within the range from 0.1–0.6) and furthermore, when x+y<2 is satisfied, is a shortage of lithium within the structure. Consequently, when this is used for the negative electrode of the lithium secondary battery, the lithium ions move in the direction for insertion into the negative electrode. That is, the cell can be operated from after charging. Therefore, this can be combined with a positive electrode active material made from a transition metal oxide containing lithium and having a high voltage with an electrode potential relative to a lithium metal electrode above 3 volts. That is to say, this can be combined with a transition metal nitride containing lithium represented by the chemical formula $Li_zM'O_2$ (where M' indicates an element of one type or two types belonging to the transition metals, and z is the range from 0.5–1.0) as the positive electrode active material. Consequently with the lithium secondary battery, a higher operating voltage, a large charge-discharge capacity, a high energy density, and a long cycle life can be obtained.

[Manufacture]

The amorphous transition metal nitride containing lithium for the negative electrode active material container of the present invention is obtained for example by amorphizing a transition metal nitride containing lithium (referred to hereunder as a precursor), represented by the chemical formula $Li_{3-y}M_yN$ (where M represents one or more elements selected from; a transition metal, group IIIA, group IVA, and group VA, and contains at least a transition metal, and y is within the range from 0.1–0.6).

The amorphizing method may involve for example; a method wherein the lithium ions are dissociated from the precursor by a chemical reaction; a method wherein the lithium ions are dissociated from the precursor by an electrochemical reaction; or a method wherein an amorphous thin film is formed from the precursor by a sputtering method.

Examples of the synthesizing methods will now be explained. At first, the precursor can/be synthesized using lithium (Li) or lithium nitride ($Li_3N$) and a transition metal or a transition metal nitride as the initial raw materials, weighed and mixed in predetermined quantities so as to give a compounding ratio for a chemical formula $Li_{3-y}M_yN$ (where M indicates an element belonging to a transition metal, and y is a range from 0.1–0.6), and then baked in an atmosphere of nitrogen. The lithium ions are then dissociated from the precursor by a chemical reaction, or an electrochemical reaction, thus giving the amorphous form.

For amorphizing by means of a chemical reaction, there is a method wherein a predetermined quantity of iodine ($I_2$) is dissolved in dehydrated acetonitrile, and the precursor then added thereto, mixed and filtered.

For amorphizing by means of an electrochemical reaction, there is a method by charge taking part in an oxidation-reduction system so as to dissociate lithium ions from a working electrode, wherein the precursor as a working electrode, the lithium metal as a counter electrode and a nonaqueous electrolyte containing a lithium salt as the electrolyte are used with a predetermined quantity of electricity.

Moreover, for amorphizing using the sputtering method, there is a method wherein a sintered body of the precursor is used as a target in a normal sputtering apparatus, and an amorphous thin film is formed thereon in an atmosphere of Ar gas.

With this method, the negative electrode in the present invention, can be made as a thin film. Hence the cell can be made extremely thin by having the negative electrode in the form of a thin film. With a cell thus reduced in thickness, a lithium secondary battery can be formed for example on top of an integrated circuit, so that weight reduction, miniaturization and slimming of various electronic devices can be advanced to unprecedented levels.

[Positive Electrode]

When as described above a negative electrode material containing a negative electrode active material container is used in the lithium secondary battery, then for the active material container contained in the positive electrode material it is possible to use for example an oxide compound or a sulphide compound of a transition metal such as, titanium, molybdenum, tungsten, niobium, vanadium, manganese, iron, chrome, nickel, cobalt or the like containing lithium.

Furthermore, with the lithium secondary battery in which the negative electrode active material container is combined with a transition metal oxide containing lithium represented by the chemical formula $Li_zM'O_2$ (where M' represents one element or two or more elements belonging to the transition metals, and z is the range from 0.5–1.0) as the positive electrode active material, then the lithium ions can be stably inserted and extracted within the voltage range of 2.5–4.2 V, and can thus have a high capacity charge-discharge region. Now if z is less than 0.5, it becomes difficult to form the oxide compound, and similarly this is so if z is greater than 1.0.

Of the compounds $Li_zM'O_2$, those such as $LiNiO_2$, $LiCoO_2$, $LiNi_{0.5}Co_{0.5}O_2$, $Li_{0.5}MnO_2$, $Li_{0.5}Ni_{0.5}V_{0.5}O_2$, $Li_{0.5}Co_{0.5}V_{0.5}O_4$, $LiFeO_2$, and $LiMnO_2$ for which a high voltage with an electrode potential relative to a lithium metal electrode of more than 3 V, and a high energy density can be expected, are well suited for the positive electrode active material.

Such a construction for a lithium secondary battery using a transition metal nitride containing lithium and represented by the chemical formula $Li_{1+x}M_yN$ as the negative electrode active material container, and using a transition metal oxide containing lithium and represented by the chemical formula $Li_zM'O_2$ (where M' indicates an element of one type or two types belonging to the transition metals, and z is the range from 0.5–1.0) as the positive electrode active material, results in a lithium secondary battery with a high voltage, a high energy density, and a large charge-discharge capacity, as well as a long cycle life.

The transition metal oxide containing lithium represented by the chemical formula $Li_zM'O_2$ (where M' indicates an element of one type or two types belonging to the transition metals, and z is the range from 0.5–1.0) being the positive electrode active material of the present invention, can be synthesized by a normal baking process, or a sputtering method in thin film formation technology.

For example, in synthesizing $LiNiO_2$ by the baking method, this can be synthesized by weighing lithium nitrate and nickel oxide according to the chemical formula, then mixing, and baking at 700° C. in an atmosphere of oxygen.

Moreover, in synthesizing $Li_{0.5}MnO_2$ for example by the sputtering method, this can be synthesized using a sintered material with a composition of $Li_{0.5}MnO_2$ as a target and forming a thin film thereon in an atmosphere of a mixture of Ar and $O_2$ gas, and then annealing the thin film in an atmosphere of oxygen at 700° C.

Furthermore, for the positive electrode active material, a sulphide compound represented by the chemical formula $Li_wFe_2(SO_4)_3$ ($0<w\leq2.0$) is also excellent. With this substance, as well as being low cost and using materials which are abundantly available, the discharge energy is high and a cell of long cycle life is possible

[Electrolyte]

For the electrolyte used in the present invention, a non-aqueous electrolyte, an electrolyte impregnated polymer matrix, a polymer electrolyte, a solid state electrolyte, or a molten salt electrolyte, are appropriate.

The nonaqueous electrolyte is in general made from a solvent with a lithium salt dissolved therein. As a solvent for the nonaqueous electrolyte, at least one or more solvents selected from: an ester of chain structure such as ethylene carbonate (EC), propylene carbonate (PC), dimethyl carbonate (DMC), diethyl carbonate (DEC), methyl ethyl carbonate (MEC); a γ-lactone such as γ-butyrolactone; an ether of chain structure such as 1,2-dimethoxyethane (DME), 1,2-diethoxyethane (DEE), 1-ethoxy,2-methoxy ethane (EME); an ether of ring structure such as tetrahydrofuran; and a nitrile such as acetonitrile, can be used. In particular, a cell using ethylene carbonate exhibits good cell characteristics.

By using a mixture solvent of ethylene carbonate and an ester of chain structure, for example dimethyl carbonate, diethyl carbonate, or methyl ethyl carbonate, or by using a mixture solvent of ethyl carbonate and an ether of chain structure, for example 1,2-dimethoxyethane, 1,2-diethoxyethane, 1-ethoxy,2-methoxy ethane, particularly good cell characteristics are displayed.

For the solute of nonaqueous electrolyte, a lithium salt such as $LiAsF_6$, $LiBF_4$, $LiPF_6$, $LiAlCl_4$, $LiClO_4$, $LiCF_3SO_3$, $LiSbF_6$, LiSCN, LiCl, $LiC_6H_5SO_3$, $LiN(CF_3SO_2)$, $LiC(CF_3SO_2)_3$, or $C_4F_9SO_3Li$, or a mixture of these may be used.

For the polymer electrolyte, a system with a lithium salt such as $LiCF_3SO_3$ dissolved in a polyetherized compound such as poly (ethylene oxide) or a system with above-mentioned nonaqueous electrolyte impregnated into a polymer latex, may be used.

For the solid state electrolyte, a system such as an $Li_2S$—$SiS_2$—$Li_3PO_4$ system or an $Li_4SiO_4$—$Li_3VO_4$ system may be used.

For the molten salt electrolyte, for example an $AlCl_3$-1-butyl-pyridinium chloride—LiCl system, or an $AlCl_3$-1-ethyl-3-methyl-imidazolium chloride—LiCl system, may be used.

As follows is a description of examples of the present invention. These examples do not limit the present invention, which can be freely modified within the scope of the claims.

EXAMPLE 1

FIG. 1 shows an example of a lithium secondary battery applicable to the present invention. With this example, a gasket 8 is provided inside a positive case 11, and a negative case 9 is fitted into the gasket 8. A negative electrode 2 is provided inside the negative case 9, and a positive electrode 12 is positioned opposite to the negative electrode 2. An electrolyte 3 is filled between the negative electrode 2 and the positive electrode 12, with a separator 4 disposed therein.

For the negative electrode active material container of the negative electrode 2, a substance containing for example $LiCo_{0.4}N$ is applicable. When $LiCo_{0.4}N$ is used, then the active material container is made by mixing; the amorphous $LiCo_{0.4}N$ synthesized by the chemical reaction as mentioned above, acetylene black as a conductive agent, and polytetrafluoroethylene as a binder, in a ratio by weight of 90:7:3, and then rolling into a sheet, and punching to a diameter of 16 mm. Moreover, the negative electrode 2 is secured to the negative case 9 by covering with a collector body 13 made from Ni mesh which is spot welded to the negative case 9.

For the electrolyte 3, a nonaqueous electrolyte is used. This has 1 mole/liter of $LiClO_4$ dissolved in a mixture solvent of EC and DEE (in a volumetric ratio of 1:1).

The separator 4 is made from a perforated film of polypropylene or polyethylene.

For example a lithium nickel compound oxide such as $LiNiO_2$ is used for the positive electrode active material of the positive electrode 12. This positive electrode is made by synthesizing $LiNiO_2$ (positive electrode active material) by a normal baking method, and then mixing this $LiNiO_2$, acetylene black as a conductive agent, and polytetrafluoroethylene as a binder, in a ratio by weight of 90:7:3, and then rolling into a sheet, and punching to a diameter of 16 mm. The positive electrode 12 is secured to the positive case 11 by covering with a collector body 7 made from Ti mesh which is spot welded to the inside of the positive case 11.

The capacity of the negative electrode and the positive electrode are adjusted so as to be the same. Moreover, the volumes of the negative electrode and the positive electrode are made so that their sum is equal to the interior volume of the lithium secondary battery The gasket 8 is for maintaining electrical insulation between the negative case 9 and the positive case 12. The opening rim of the positive case 11 is bent inwards and crimped over to thereby close off and seal the contents inside the cell.

EXAMPLE 2

Figure 2:
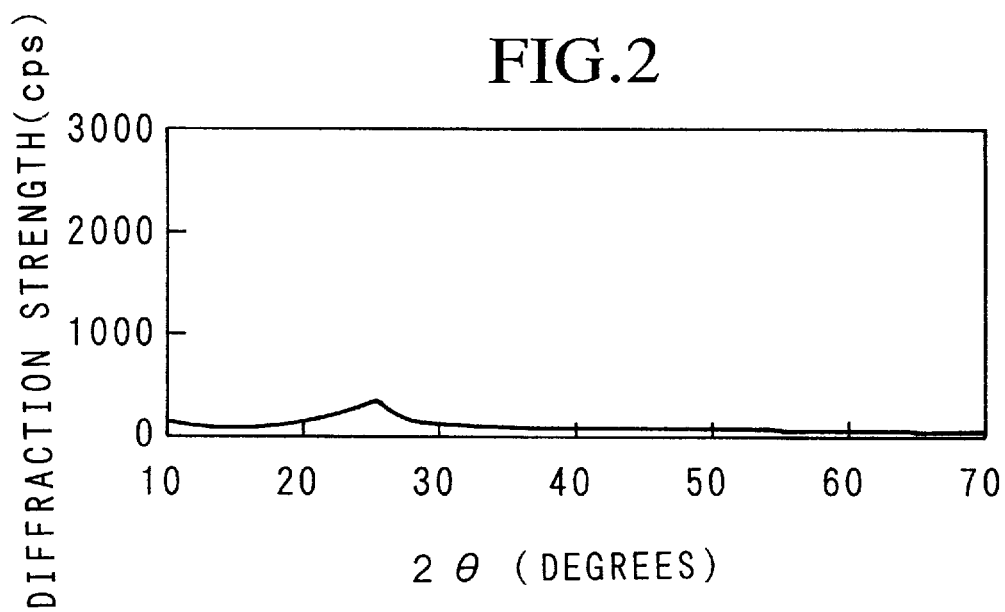
FIG. 2 is a graph showing an X-ray diffraction pattern of $LiCo_{0.4}N$ of example 2.

FIG. 2 shows a diffraction pattern measured using an X-ray powder diffraction apparatus, of $LiCo_{0.4}N$ synthesized by a chemical reaction so as to give the amorphous form. Copper was used in the tube of the X-ray diffraction apparatus, and measurements were made at a tube voltage of 30 kV and a tube current of 100 mA.

As is apparent from FIG. 2, with this $LiCo_{0.4}N$, a broad peak is observed in the vicinity of 2θ=25°. However in the range for 2θ from 10–70 degrees, except for this peak there is no evidence of a diffraction peak, thus verifying this $LiCo_{0.4}N$ to be amorphous.

EXAMPLE 3

Figure 3:
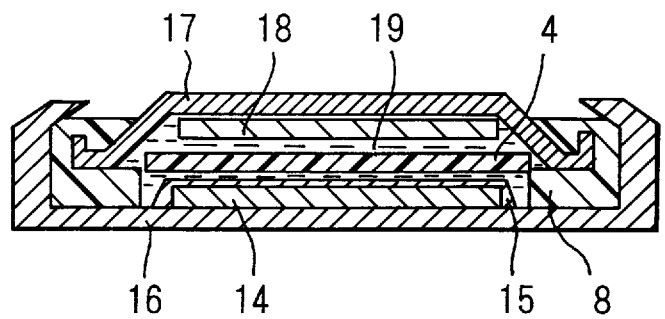
FIG. 3 is a cross-sectional view of a test cell used with the examples.

FIG. 3 shows a test cell used in performance assessment of the negative electrode active material container of the lithium secondary battery according to the present invention. This test cell is an experimental type used for experiments on the negative electrode active material container, and as such is not a practical lithium secondary battery.

With this test cell, negative electrode active material containers serving as experimental samples, were used as a working electrode 14. The respective materials (experimental samples) were formed into the working electrode 14 by mixing with acetylene black as a conductive agent, and polytetrafluoroethylene as a binder, in a ratio by weight of 70:25:5, and then rolling into a sheet, and punching to a diameter of 16 mm. The working electrode 14 was secured to a working electrode case 16 by covering with a net-like titanium collector body 15. The working electrode case 16 was made by press forming a stainless steel plate. A gasket 8 was provided inside the working electrode case 16, and a counter electrode case 17 fitted into the gasket 8. The counter electrode case 17 was also made by press forming a stainless steel plate. The gasket 8 maintained electrical insulation between the counter electrode case 17 and the working electrode case 16. A counter electrode 18 made from metallic lithium was provided inside the counter electrode case 17. With the counter electrode 18, a lithium metal foil of a predetermined thickness, punched to a diameter of 16 mm, was bonded to the counter electrode case 17. A separator 4 made from a perforated film of polypropylene or polyethylene was located between the working electrode 14 and the counter electrode 18. Moreover, a nonaqueous electrolyte 19 was filled between the working electrode 14 and the counter electrode 18. The nonaqueous electrolyte 19 had $LiClO_4$ dissolved as one mole/liter in a mixture solvent of a 1:1 volume ratio of EC and DEE.

With a test cell with the abovementioned amorphous $LiCo_{0.4}N$ synthesized by a chemical reaction used for the working electrode 14, charge-discharge tests were carried out with a voltage range from 0.0–1.4 V and a current of 1 mA. The charge-discharge curve for the third cycle is shown in FIG. 4.

Figure 4:
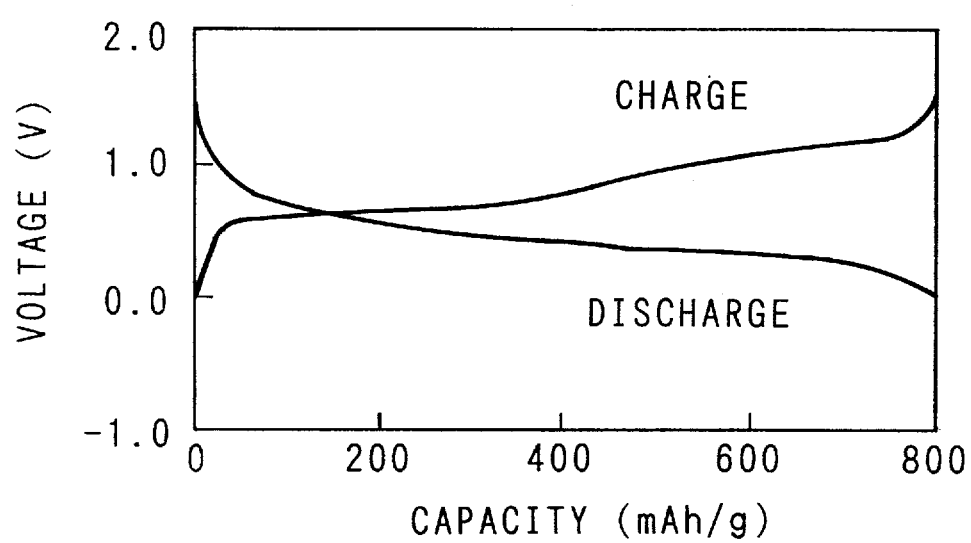
FIG. 4 is a graph showing a charge-discharge curve for a third cycle of a test cell wherein $LiCo_{0.4}N$ of example 3 is used for the negative electrode.

As is clear from FIG. 4, with this $LiCo_{0.4}N$, reversible insertion and extraction of the lithium ions was possible within the voltage range from 0.0–1.4 V. Steady charging and discharging was repeated for more than 50 cycles without observing any accompanying sudden drop in capacity. A capacity of 56 mAh was obtained under this steady repetition of the charging and discharging, and converting this to capacity per weight of negative electrode active material container of the working electrode, gives a capacity ratio of 800 mAh/g.

On completion of the charge-discharge tests, the test cell was disassembled and the working electrode surface examined with a scanning electron microscope (SEM). However there was no evidence of lithium metal deposits or dendrite growth on the surface of the working electrode. The working electrode was also analyzed with an X-ray diffraction apparatus, however no lithium metal X-ray diffraction pattern was found.

EXAMPLE 4

The test cell of example 3 was tested under charge-discharge conditions with a voltage range from 0.0–1.0 V and a current of 1 mA. The charge-discharge curve for the third cycle is shown in FIG. 5.

Figure 5:
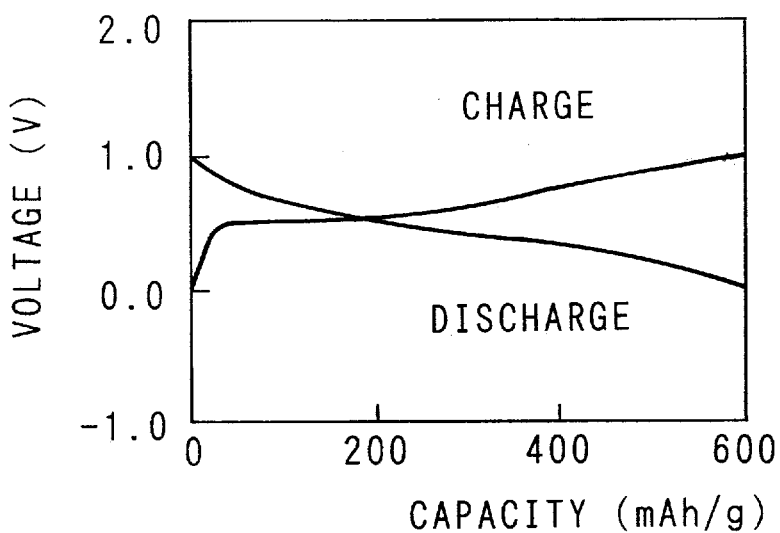
FIG. 5 is a graph showing a charge-discharge curve for a third cycle of a test cell wherein $LiCo_{0.4}N$ of example 4 is used for the negative electrode.

As is clear from FIG. 5, with this $LiCo_{0.4}N$, reversible insertion and extraction of the lithium ions was possible within the voltage range from 0.0–1.0 V. Steady charging and discharging was repeated for more than 50 cycles without observing any accompanying sudden drop in capacity. A capacity of 48 mAh was obtained under this steady repetition of the charging and discharging, and converting this to capacity per weight of negative electrode active material container of the working electrode, gives a capacity ratio of 600 mAh/g.

On completion of the charge-discharge tests, the test cell was disassembled and the working electrode surface examined with an SEM. However there was no evidence of lithium metal deposits or dendrite growth on the surface of the working electrode. The working electrode was also analyzed with an X-ray diffraction apparatus, however no lithium metal X-ray diffraction pattern was found.

EXAMPLE 5

With $LiCo_{0.3}N$ synthesized by an electrochemical reaction so as to give the amorphous form, a diffraction pattern was measured using an X-ray powder diffraction apparatus. Copper was used in the tube of the X-ray diffraction apparatus, and measurements were made at a tube voltage of 30 kV and a tube current of 100 mA.

Figure 6:
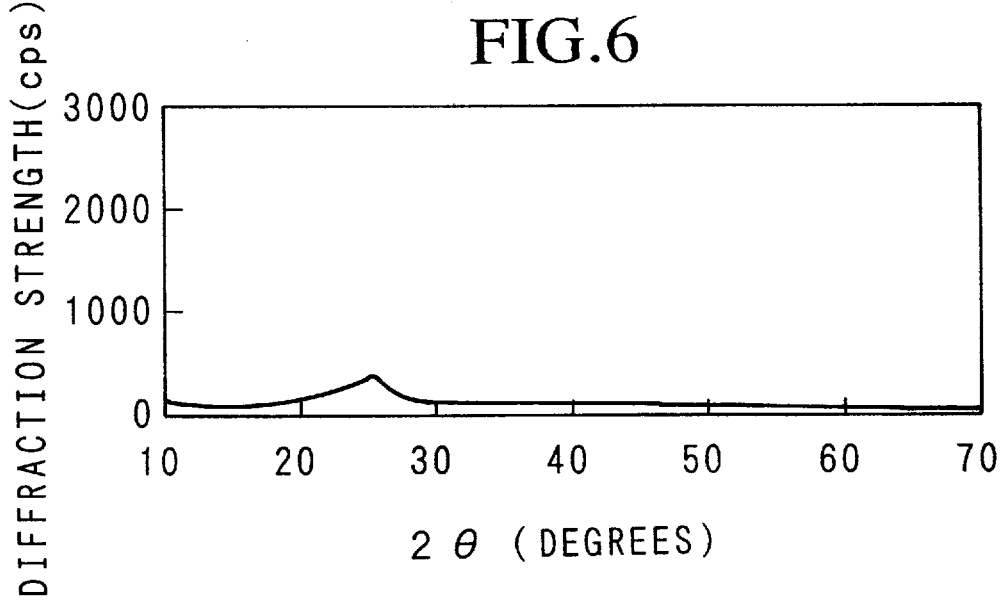
FIG. 6 is a graph showing an X-ray diffraction pattern of $LiCo_{0.3}N$ of example 5.

As shown in FIG. 6, with this $LiCo_{0.3}N$, a broad peak is observed in the vicinity of $2\theta=25°$. However in the range for $2\theta$ from 10–70 degrees, except for this peak there is no evidence of a diffraction peak, thus verifying this $LiCo_{0.3}N$ to be amorphous.

Tests were also made with this $LiCo_{0.3}N$ substituted for the $LiCo_{0.4}N$ of the working electrode 14 of example 3. The working electrode was made by mixing; the abovementioned amorphous $LiCo_{0.3}N$ synthesized by the electrochemical reaction, acetylene black as a conductive agent, and polytetrafluoroethylene as a binder, in a ratio by weight of 70:25:5, and then rolling into a sheet, and punching to a diameter of 16 mm. Apart from the working electrode 14, components the same as for example 3 were used.

Tests were made using this test cell under charge-discharge conditions with a voltage range from 0.0–1.2 V and a current of 1 mA. With this $LiCo_{0.3}N$ also, reversible insertion and extraction of the lithium ions was possible. Steady charging and discharging was repeated for more than 50 cycles without observing any accompanying sudden drop in capacity. A capacity of 58 mAh was obtained under this steady repetition of the charging and discharging, and converting this to capacity per weight of negative electrode active material container of the working electrode, gives a capacity ratio of 850 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 6

With $Li_{1.2}Co_{0.4}N$ synthesized by an electrochemical reaction so as to give the amorphous form, a diffraction pattern was measured using an X-ray powder diffraction apparatus. Copper was used in the tube of the X-ray diffraction apparatus, and measurements were made at a tube voltage of 30 kV and a tube current of 100 mA.

Figure 7:
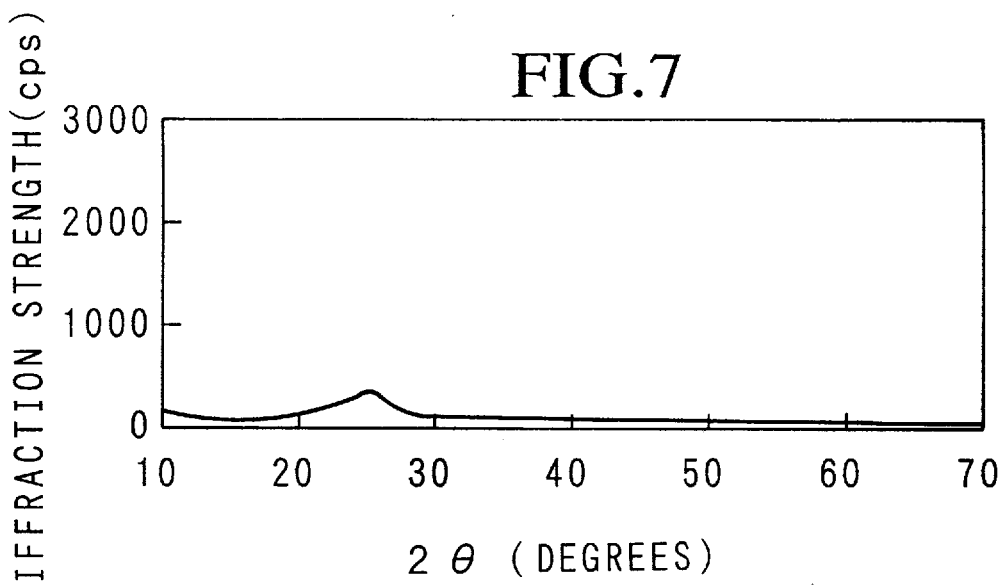
FIG. 7 is a graph showing an X-ray diffraction pattern of $Li_{1.2}Co_{0.4}N$ of example 6.

As shown in FIG. 7, with the $Li_{1.2}Co_{0.4}N$, a broad peak is observed in the vicinity of $2\theta=25°$. However in the range for $2\theta$ from 10–70 degrees, except for this peak there is no evidence of a diffraction peak, thus verifying this $Li_{1.2}Co_{0.4}N$ to be amorphous.

Tests were also made with the $Li_{1.2}Co_{0.4}N$ substituted for the $LiCo_{0.4}N$ of the working electrode 14 of example 3. This working electrode was made by mixing; the abovementioned amorphous $Li_{1.2}Co_{0.4}N$ synthesized by the electrochemical reaction, acetylene black as a conductive agent, and polytetrafluoroethylene as a binder, in a ratio by weight of 70:25:5, and then rolling into a sheet, and punching to a diameter of 16 mm. Apart from the working electrode 14, components the same as for example 3 were used. Tests were made using this test cell under charge-discharge conditions with a voltage range from 0.0–1.4 V and a current of 1 mA. With this $Li_{1.2}Co_{0.4}N$ also, reversible insertion and extraction of the lithium ions was possible. Steady charging and discharging was repeated for more than 50 cycles without observing any accompanying sudden drop in capacity. A capacity of 55 mAh was obtained under this steady repetition of the charging and discharging, and converting this to capacity per weight of negative electrode active material container of the working electrode, gives a capacity ratio of 780 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 7

With $LiNi_{0.4}N$ synthesized by a chemical reaction so as to give the amorphous form, a diffraction pattern was measured using an X-ray powder diffraction apparatus. Copper was used in the tube of the X-ray diffraction apparatus, and measurements were made at a tube voltage of 30 kV and a tube current of 100 mA.

Figure 8:
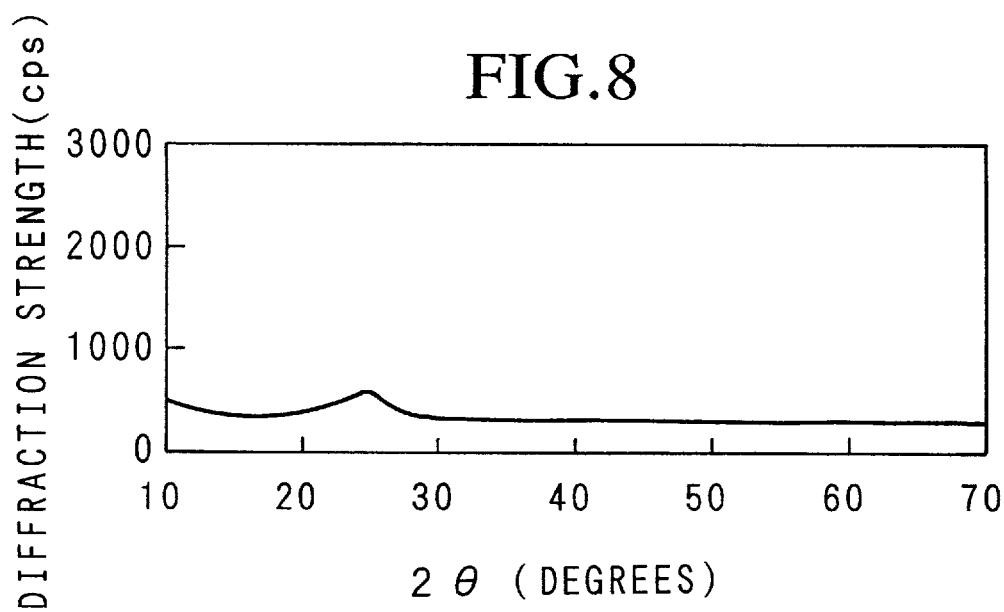
FIG. 8 is a graph showing an X-ray diffraction pattern of $LiNi_{0.4}N$ of example 7.

As shown in FIG. 8, with this $LiNi_{0.4}N$, a broad peak is observed in the vicinity of $2\theta=25°$. However in the range for $2\theta$ from 10–70 degrees, except for this peak there is no evidence of a diffraction peak, thus verifying this $LiNi_{0.4}N$ to be amorphous.

Tests were also made with this $LiNi_{0.4}N$ substituted for the $LiCo_{0.4}N$ of the working electrode 14 of example 3. The working electrode was made by mixing; the abovementioned amorphous $LiNi_{0.4}N$ synthesized by the chemical reaction, acetylene black as a conductive agent, and polytetrafluoroethylene as a binder, in a ratio by weight of 70:25:5, and then rolling into a sheet, and punching to a diameter of 16 mm. Apart from the working electrode 14, components the same as for example 3 were used.

Tests were made using this test cell under charge-discharge conditions with a voltage range from 0.0–1.2 V and a current of 1 mA. The charge-discharge curve for the third cycle is shown in FIG. 9.

Figure 9:
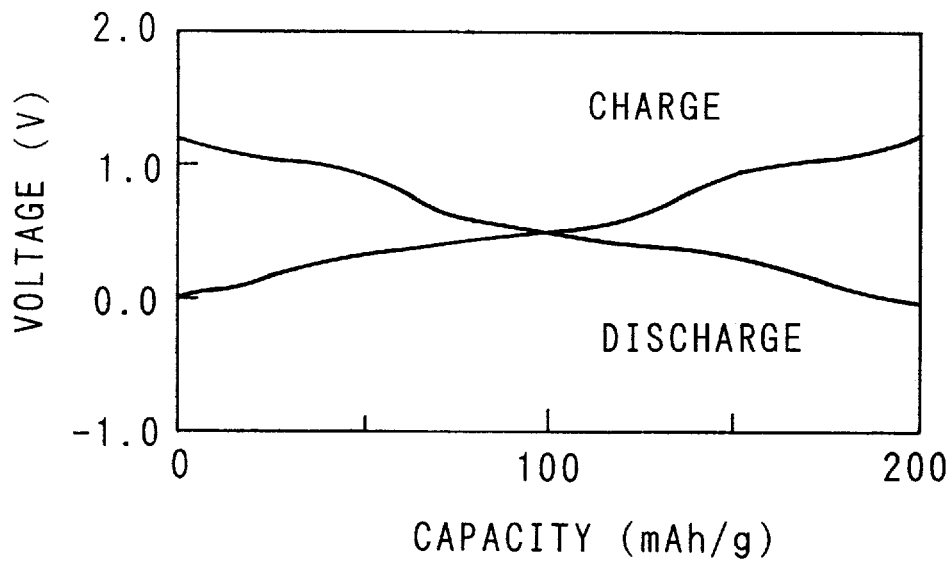
FIG. 9 is a graph showing a charge-discharge curve for a third cycle of a test cell wherein $LiNi_{0.4}N$ of example 7 is used for the negative electrode.

As is clear from FIG. 9, with this $LiNi_{0.4}N$ also, reversible insertion and extraction of the lithium ions was possible within the voltage range from 0.0–1.2 V. Steady charging and discharging was repeated for more than 50 cycles without observing any accompanying sudden drop in capacity. A capacity of 16 mAh was obtained under this steady repetition of the charging and discharging, and converting this to capacity per weight of negative electrode active material container of the working electrode, gives a capacity ratio of 200 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 8

With $LiCu_{0.4}N$ synthesized by an electrochemical reaction so as to give the amorphous form, a diffraction pattern was measured using an X-ray powder diffraction apparatus. Copper was used in the tube of the X-ray diffraction apparatus, and measurements were made at a tube voltage of 30 kV and a tube current of 100 mA.

Figure 10:
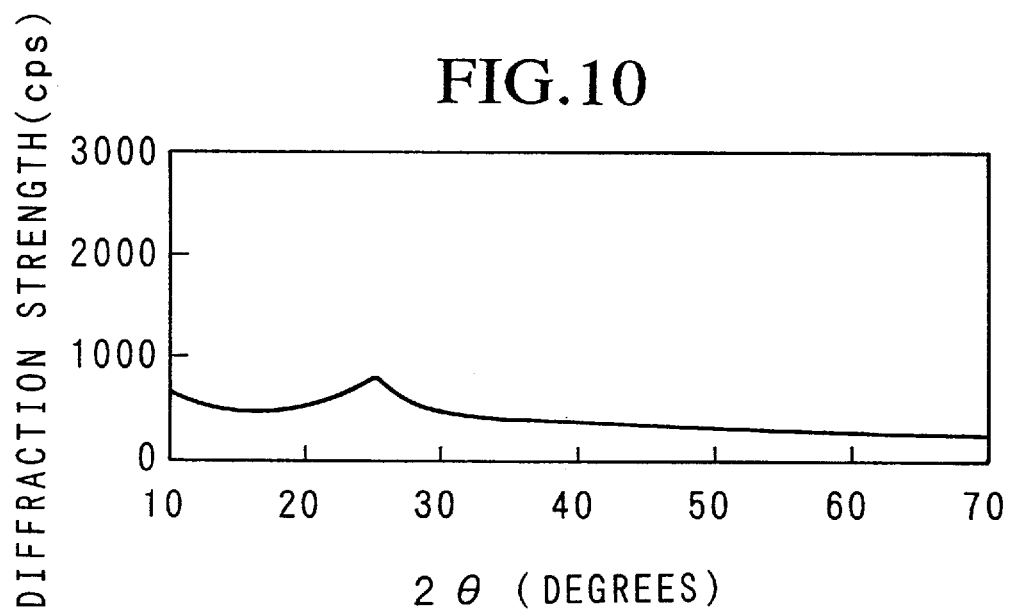
FIG. 10 is a graph showing an X-ray diffraction pattern of $LiCu_{0.4}N$ of example 8.

As shown in FIG. 10, with this $LiCu_{0.4}N$, a broad peak is observed in the vicinity of $2\theta=25°$. However in the range for $2\theta$ from 10–70 degrees, except for this peak there is no evidence of a diffraction peak, thus verifying this $LiCu_{0.4}N$ to be amorphous.

Tests were also made with this $LiCu_{0.4}N$ substituted for the $LiCo_{0.4}N$ of the working electrode 14 of example 3. The working electrode was made by mixing; the abovementioned amorphous $LiCu_{0.4}N$ synthesized by the electrochemical reaction, acetylene black as a conductive agent, and polytetrafluoroethylene as a binder, in a ratio by weight of 70:25:5, and then rolling into a sheet, and punching to a diameter of 16 mm. Apart from the working electrode 14, components the same as for example 3 were used.

Tests were made using this test cell under charge-discharge conditions with a voltage range from 0.0–1.4 V and a current of 1 mA. The charge-discharge curve for the third cycle is shown in FIG. 11.

Figure 11:
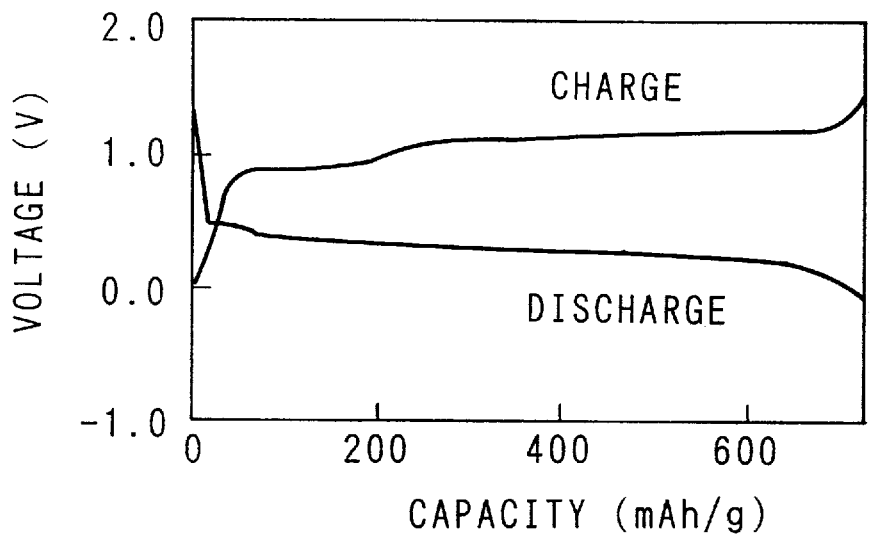
FIG. 11 is a graph showing a charge-discharge curve for a third cycle of a test cell wherein $LiCu_{0.4}N$ of example 8 is used for the negative electrode.

As is clear from FIG. 11, with this $LiCu_{0.4}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 50 mAh was obtained under this steady repetition of the charging and discharging, and converting this to capacity per weight of negative electrode active material container of the working electrode, gives a capacity ratio of 720 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 9

With thin film $Li_{1.5}Cu_{0.4}N$ made by a sputtering method, a diffraction pattern was measured using an X-ray diffraction apparatus. Copper was used in the tube of the X-ray diffraction apparatus, and measurements were made at a tube voltage of 30 kV and a tube current of 100 mA.

Figure 12:
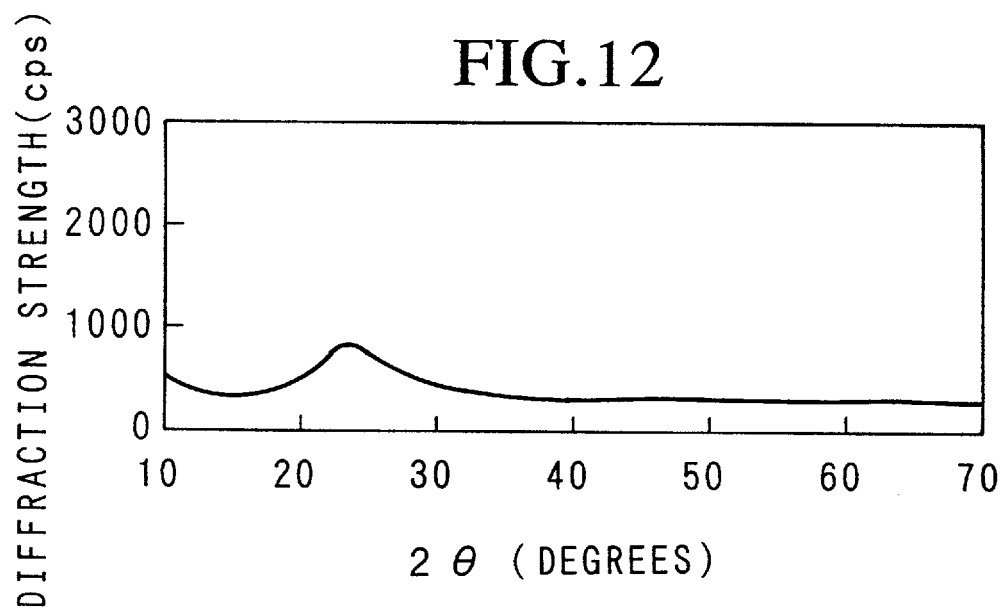
FIG. 12 is a graph showing an X-ray diffraction pattern of $Li_{1.5}Cu_{0.4}N$ of example 9.

As shown in FIG. 12, with this $Li_{1.5}Cu_{0.4}N$, a broad peak is observed in the vicinity of $2\theta=25°$. However in the range for $2\theta$ from 10–70 degrees, except for this peak there is no evidence of a diffraction peak, thus verifying this $Li_{1.5}CU_{0.4}N$ to be amorphous.

Tests were also made using this amorphous $Li_{1.5}Cu_{0.4}N$ formed by the sputtering method, for the working electrode 14 of example 3. The working electrode was basically made as follows. A sintered body of chemical composition $Li_{2.6}Cu_{0.4}N$ as a target, and a 16 mm diameter stainless steel plate as a base plate, were arranged inside a standard high frequency sputtering apparatus. Then after evacuating the chamber, Ar gas was introduced, and the high frequency sputtering apparatus operated with a power of 200 watts and with the Ar gas atmosphere at a pressure of 1 Pa, so that a thin film of amorphous $Li_{1.5}Cu_{0.4}N$ was formed on the stainless base plate, giving the working electrode 14. The resultant thin film thickness was 5 microns. This working electrode 14 was then spot welded inside the working electrode case 16. Apart from the working electrode 14, components the same as for example 3 were used.

Tests were made using this test cell under charge-discharge conditions with a voltage range from 0.0–1.4 V and a current of 1 mA. With this $Li_{1.5}Cu_{0.4}N$ also, reversible insertion and extraction of the lithium ions was possible within the voltage range from 0.0–1.4 V. Steady charging and discharging was repeated for more than 50 cycles without observing any accompanying sudden drop in capacity.

Moreover while there was an extremely thin working electrode, steady charging and discharging could be repeated. A resultant capacity of 1.6 mAh was obtained, and converting this to capacity per weight of negative electrode active material container of the working electrode, gives a capacity ratio of 800 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 10

Figure 13:
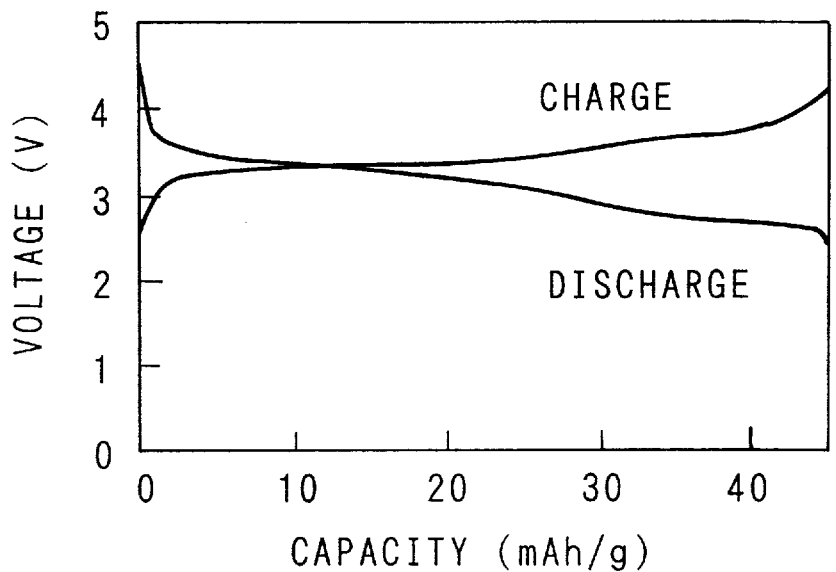
FIG. 13 is a graph showing a charge-discharge curve for a fifth cycle of a lithium secondary battery according to example 10.

With the lithium secondary battery shown in FIG. 1 and described in example 1, using the abovementioned amorphized $LiCo_{0.4}N$ for the working electrode 14, charge-discharge tests were carried out with a voltage range from 2.5–4.2 V and a current of 1 mA. FIG. 13 shows the charge-discharge curve for the fifth cycle. As is clear from FIG. 13, a capacity of 45 mAh was obtained This lithium secondary battery was subjected to extremely steady repeated charging and discharging, and a cycle life of 600 cycles obtained.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 11

Figure 14:
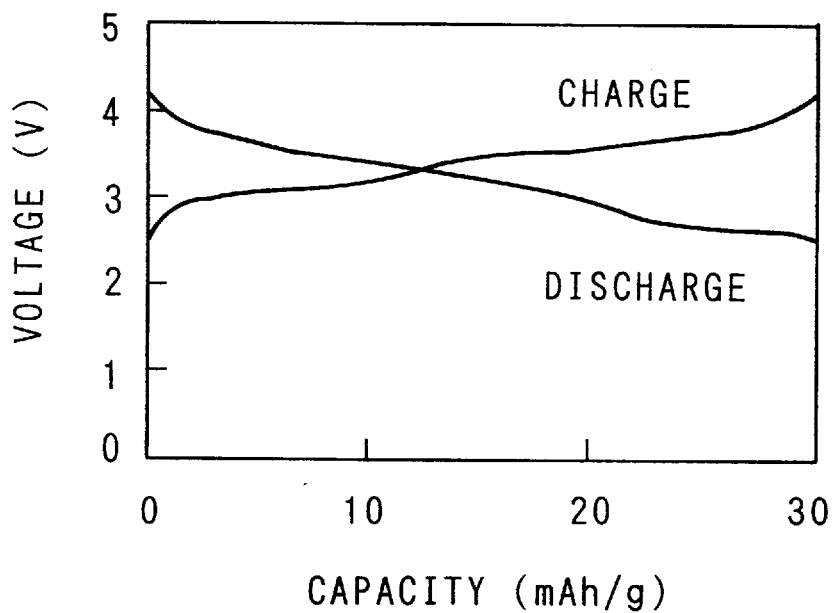
FIG. 14 is a graph showing a charge-discharge curve for a fifth cycle of a lithium secondary battery according to example 11.

With the lithium secondary battery of example 1, $LiNi_{0.4}N$ was used for the negative electrode active material container of the negative electrode 2. This $LiNi_{0.4}N$ was the abovementioned amorphous $LiNi_{0.4}N$ synthesized by the chemical reaction. The method of manufacture of the negative electrode 2 was the same as for example 1, and apart from the negative electrode 2, components the same as for example 1 were used. With this lithium secondary battery, charge-discharge tests were carried out with a voltage range from 2.5–4.2 V and a current of 1 mA. FIG. 14 shows the charge-discharge curve for the fifth cycle.

As is clear from FIG. 14, a capacity of 30 mAh was obtained. Moreover, this lithium secondary battery also was subjected to steady repeated charging and discharging, giving a cycle life of 450 cycles.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 12

Figure 15:
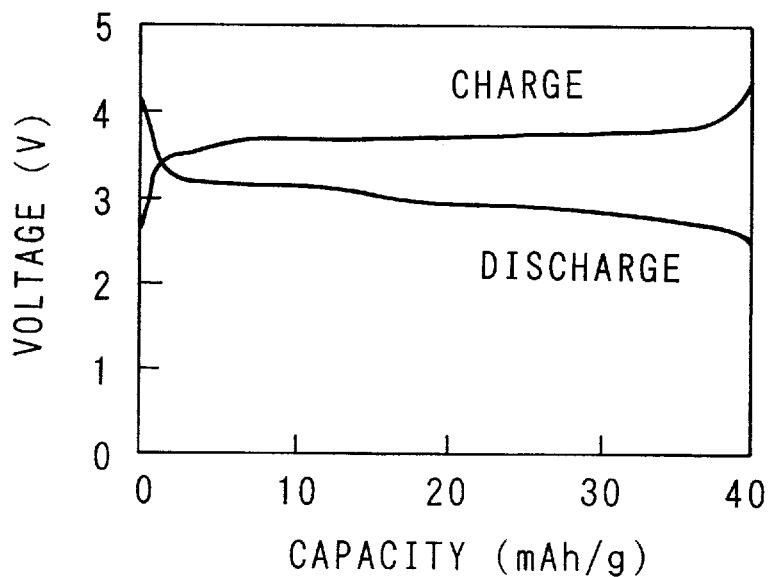
FIG. 15 is a graph showing a charge-discharge curve for a fifth cycle of a lithium secondary battery according to example 12.

With the lithium secondary battery of example 1, $LiCu_{0.4}N$ was used for the negative electrode active material container of the negative electrode 2. This $LiCu_{0.4}N$ was the abovementioned amorphous $LiCu_{0.4}N$ synthesized by the electrochemical reaction. The method of manufacture of the negative electrode 2 was the same as for example 1, and apart from the negative electrode 2, components the same as for example 1 were used. With this lithium secondary battery, charge-discharge tests were carried out with a voltage range from 2.5–4.2 V and a current of 1 mA. FIG. 15 shows the charge-discharge curve for the fifth cycle.

As is clear from FIG. 15, a capacity of 40 mAh was obtained. Moreover, this lithium secondary battery also was subjected to steady repeated charging and discharging, giving a cycle life of 550 cycles.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 13

With the lithium secondary battery of example 1, a solution of 1 mole/liter of $LiClO_4$ dissolved in a mixture solvent of EC and DME (in a volumetric ratio of 1:1) was used for the nonaqueous electrolyte 3. Apart from the nonaqueous electrolyte, components the same as for example 1 were used. With this lithium secondary battery, charge-discharge tests were carried out with a voltage range from 2.5–4.2 V and a current of 1 mA.

The capacity of this lithium secondary battery under repeated steady charging and discharging was 43 mAh. Moreover, under the steady repeated charging and discharging, a cycle life of 580 cycles was obtained.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 14

Figure 16:
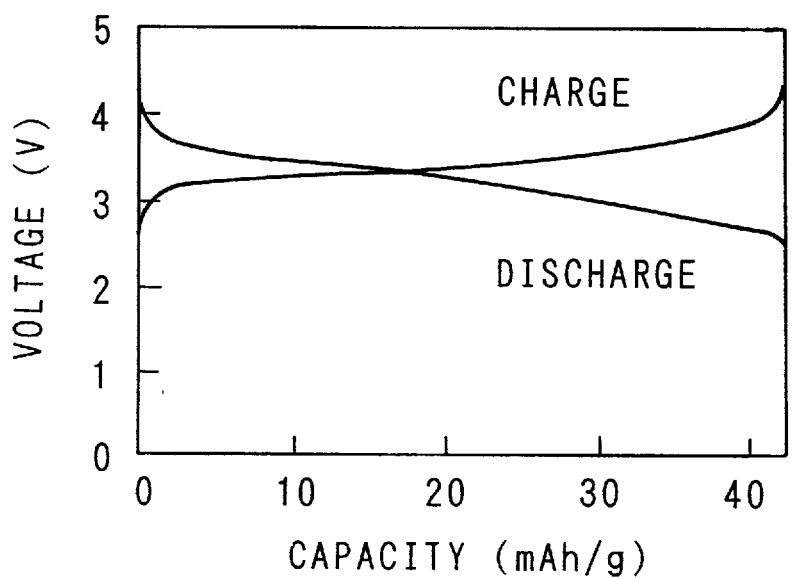
FIG. 16 is a graph showing a charge-discharge curve for a fifth cycle of a lithium secondary battery according to example 14.

With the lithium secondary battery of example 1, a solution of 1 mole/liter of $LiClO_4$ dissolved in a mixture solvent of EC and DMC (in a volumetric ratio of 1:1) was used for the nonaqueous electrolyte 3. Apart from the nonaqueous electrolyte, components the same as for example 1 were used. With this lithium secondary battery, charge-discharge tests were carried out with a voltage range from 2.5–4.2 V and a current of 1 mA. FIG. 16 shows the charge-discharge curve for the fifth cycle.

As is clear from FIG. 16, a capacity of 42 mAh was obtained. Moreover, this lithium secondary battery also was subjected to steady repeated charging and discharging, giving a cycle life of 550 cycles.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 15

Figure 17:
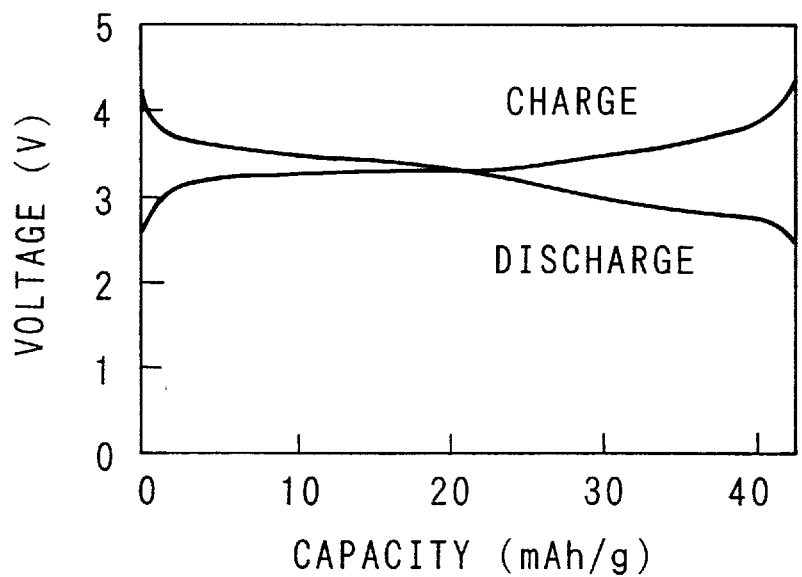
FIG. 17 is a graph showing a charge-discharge curve for a fifth cycle of a lithium secondary battery according to example 15.

With the lithium secondary battery of example 14, a nonaqueous electrolyte with the solute of the nonaqueous electrolyte 3 changed from $LiClO_4$ to $LiPF_6$ was used. The concentration of the solute was 1 mole/liter. Apart from the solute of the nonaqueous electrolyte, components the same as for example 14 were used. With this lithium secondary battery, charge-discharge tests were carried out with a voltage range from 2.5–4.2 V and a current of 1 mA. FIG. 17 shows the charge-discharge curve for the fifth cycle.

As is clear from FIG. 17, a capacity of 42 mAh was obtained. Moreover, this lithium secondary battery also was subjected to steady repeated charging and discharging, giving a cycle life of 580 cycles.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 16

With the lithium secondary battery of example 11, a solution of 1 mole/liter of $LiClO_4$ dissolved in a mixture solvent of EC and DMC (in a volumetric ratio of 1:1) was used for the nonaqueous electrolyte 3. Apart from the nonaqueous electrolyte, components the same as for example 11 were used. With this lithium secondary battery, charge-discharge tests were carried out with a voltage range from 2.5–4.2 V and a current of 1 mA. The capacity of this lithium secondary battery under repeated steady charging and discharging was 31 mAh. Moreover, under the steady repeated charging and discharging, a cycle life of 480 cycles was obtained.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 17

With the lithium secondary battery of example 12, a solution of 1 mole/liter of $LiClO_4$ dissolved in a mixture solvent of EC and DMC (in a volumetric ratio of 1:1) was used for the nonaqueous electrolyte 3. Apart from the nonaqueous electrolyte, components the same as for example 12 were used. With this lithium secondary battery, charge-discharge tests were carried out with a voltage range from 2.5–4.2 V and a current of 1 mA. The capacity of this lithium secondary battery under repeated steady charging and discharging was 42 mAh. Moreover, under the steady repeated charging and discharging, a cycle life of 530 cycles was obtained.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 18

With the lithium secondary battery of example 17, a nonaqueous electrolyte with the solute of the nonaqueous electrolyte 3 changed from $LiClO_4$ to $LiPF_6$ was used. The concentration of the solute was 1 mole/liter. Apart from the solute of the nonaqueous electrolyte, components the same as for example 17 were used. With this lithium secondary battery, charge-discharge tests were carried out with a voltage range from 2.5–4.2 V and a current of 1 mA. The capacity of this lithium secondary battery under repeated steady charging and discharging was 40 mAh. Moreover, under the steady repeated charging and discharging, a cycle life of 550 cycles was obtained.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

EXAMPLE 19

Figure 18:
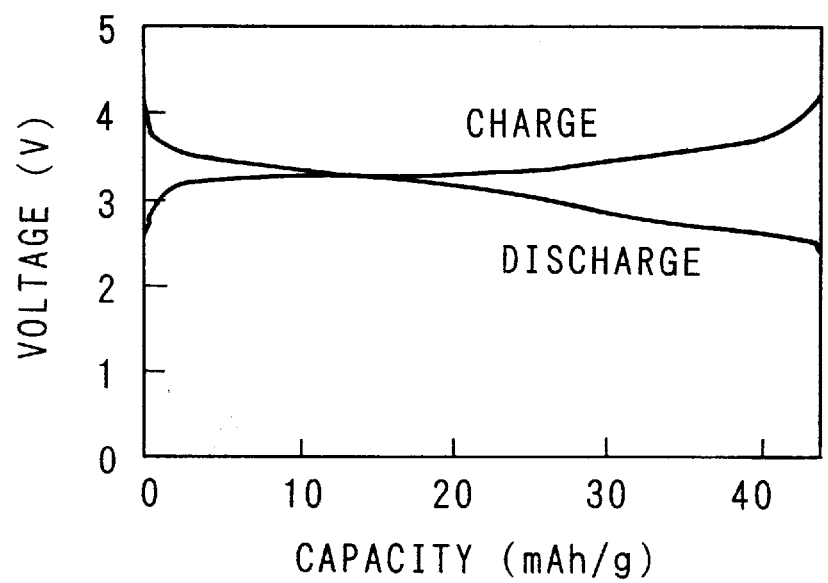
FIG. 18 is a graph showing a charge-discharge curve for a fifth cycle of a lithium secondary battery according to example 19.

With the lithium secondary battery of example 15, a solution of 1 mole/liter of $LiClO_4$ dissolved in a mixture solvent of EC and DEC (in a volumetric ratio of 1:1) was used for the nonaqueous electrolyte 3. Apart from the solute of the nonaqueous electrolyte, components the same as for example 15 were used. With this lithium secondary battery, charge-discharge tests were carried out with a voltage range from 2.5–4.2 V and a current of 1 mA. FIG. 18 shows the charge-discharge curve for the fifth cycle. As is clear from FIG. 18, a capacity of 43 mAh was obtained. Moreover, this lithium secondary battery also was subjected to steady repeated charging and discharging, giving a cycle life of 550 cycles.

On completion of the charge-discharge tests, the cell was disassembled and the negative electrode surface examined with an SEM. However there was no evidence of lithium metal deposits or dendrite growth on the negative electrode surface. The negative electrode was also analyzed with an X-ray diffraction apparatus, however no lithium metal X-ray diffraction pattern could be found.

CONTROL EXAMPLE 1

For the purposes of comparison, a cell was made wherein the negative electrode active material container of the negative electrode 2 in the lithium secondary battery of example 1, was changed to natural graphite. The negative electrode 2 was made as follows. Polytetrafluoroethylene serving as a binder was mixed with standard natural graphite and the mixture then rolled into a sheet, and punched to a diameter of 16 mm to from the negative electrode. The ratio by weight of negative electrode active material to binder was 95:5. The negative electrode 2 was secured to the negative case 9 by covering with a collector body 13 made from Ni mesh which was spot welded to the negative case 9. Apart from the negative electrode 2, construction was the same as for example 1.

Figure 19:
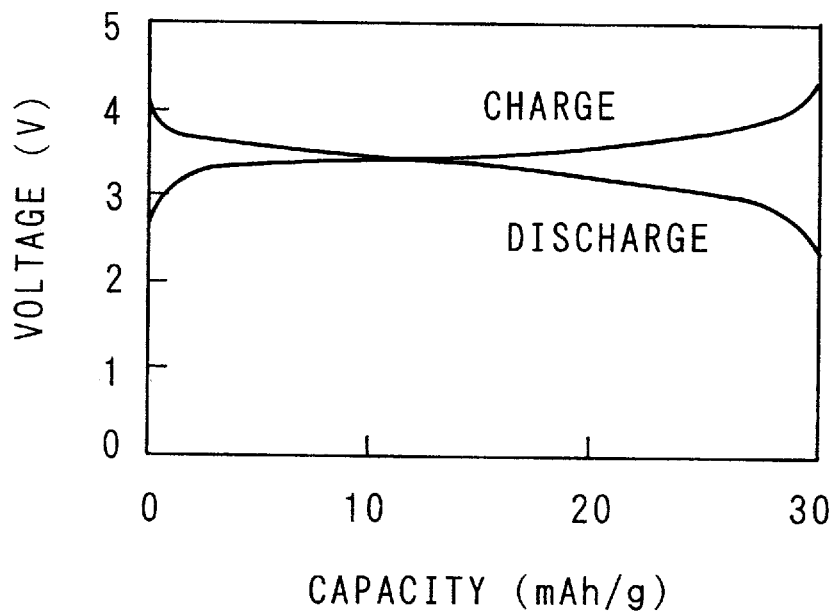
FIG. 19 is a graph showing a charge-discharge curve for a fifth cycle of a lithium secondary battery according to control example 1.

With this lithium secondary battery, charge-discharge tests were carried out with a voltage range from 2.5–4.2 V and a current of 1 mA. FIG. 19 shows the charge-discharge curve for the fifth cycle.

This lithium secondary battery was subjected to extremely steady repeated charging and discharging, and a cycle life of 600 cycles obtained. However as is clear from FIG. 19, a capacity of only 30 mAh was obtained.

CONTROL EXAMPLE 2

A lithium secondary battery was constructed having the same construction as the lithium secondary battery shown in FIG. 1 and described in example 1, except that lithium metal was used for the negative electrode. Charge-discharge tests were carried on this lithium secondary battery, with a voltage range from 2.5–4.2 V and a current of 1 mA.

With this lithium secondary battery, a capacity of 40 mAh was obtained for the initial cycles, however the capacity dropped sharply from the twenty fifth cycle, and by the thirtieth cycle had fallen to 0 mAh. Table 1 shows the characteristics of the respective lithium secondary batteries of example 10 and control examples 1 and 2.

TABLE 1

|  | 5th cycle capacity | Cycle life |
| --- | --- | --- |
| Example 10 ($LiCo_{0.4}N/LiNiO_2$) | 45 mAh | 600 cycles |
| Control example 1 (Graphite/$LiNiO_2$) | 30 mAh | 600 cycles |
| Control example 2 (Li metal/$LiNiO_2$) | — | 30 cycles |

As is clear from Table 1, with the lithium secondary battery of the present invention, a capacity of more than 150% of the conventional lithium secondary battery using a graphitized carbon for the negative electrode active material container was obtained. Moreover cycle life was excellent, and compared to a lithium secondary battery with lithium metal for the negative electrode, an extremely long cycle life was possible. Consequently, the lithium secondary battery of the present invention provides both a large charge-discharge capacity and a long cycle life.

EXAMPLE 20

Using the test cell shown in FIG. 3 and described in example 3, with $LiCo_{0.5}N$ synthesized by an electrochemical reaction so as to give the amorphous form, charge-discharge tests were carried out with a voltage range from 0.0–1.4 V and a current of 1 mA. The charge-discharge curve for the second cycle is shown in FIG. 20.

Figure 20:
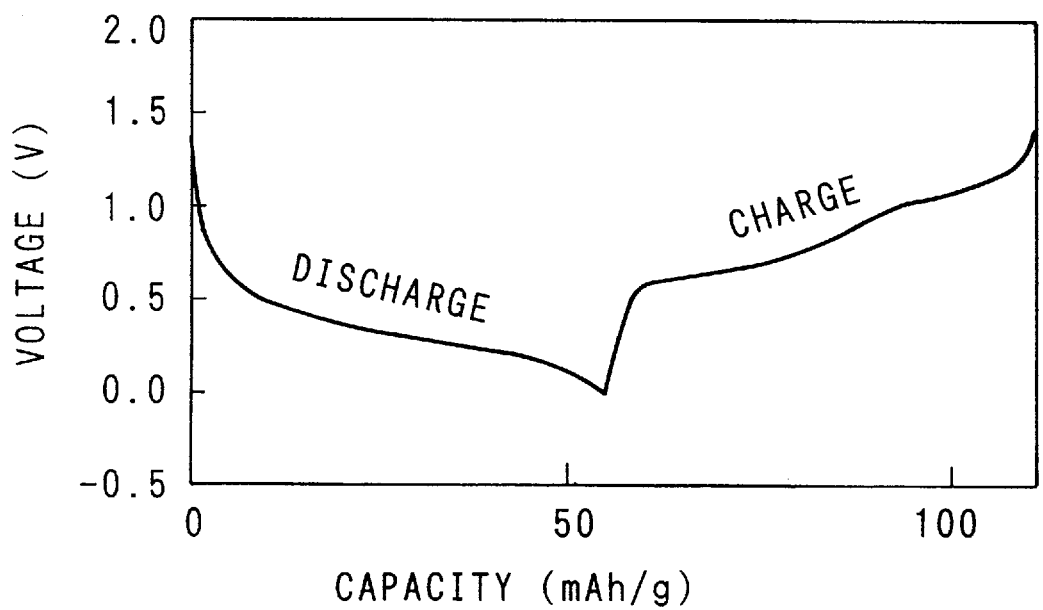
FIG. 20 is a graph showing a charge-discharge curve for a second cycle of a test cell wherein $LiCo_{0.5}N$ of example 20 is used for the working electrode.

As is clear from FIG. 20, with this $LiCo_{0.5}N$, reversible insertion and extraction of the lithium ions was possible within the voltage range from 0.0–1.4 V. Steady charging and discharging was repeated for more than 50 cycles without observing any accompanying sudden drop in capacity. A capacity of 56 mAh was obtained under this steady repetition of the charging and discharging, and converting this to capacity per weight of negative electrode active material container of the working electrode, gives a capacity ratio of 850 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern was found.

EXAMPLE 21

The $LiCo_{0.5}N$ in example 20 was replaced by $Li_{1.15}Co_{0.5}N$ synthesized by a chemical reaction so as to give the amorphous form. Charge-discharge tests were carried out with a voltage range from 0.0–1.3 V and a current of 1 mA. The charge-discharge curve for the second cycle is shown in FIG. 21.

Figure 21:
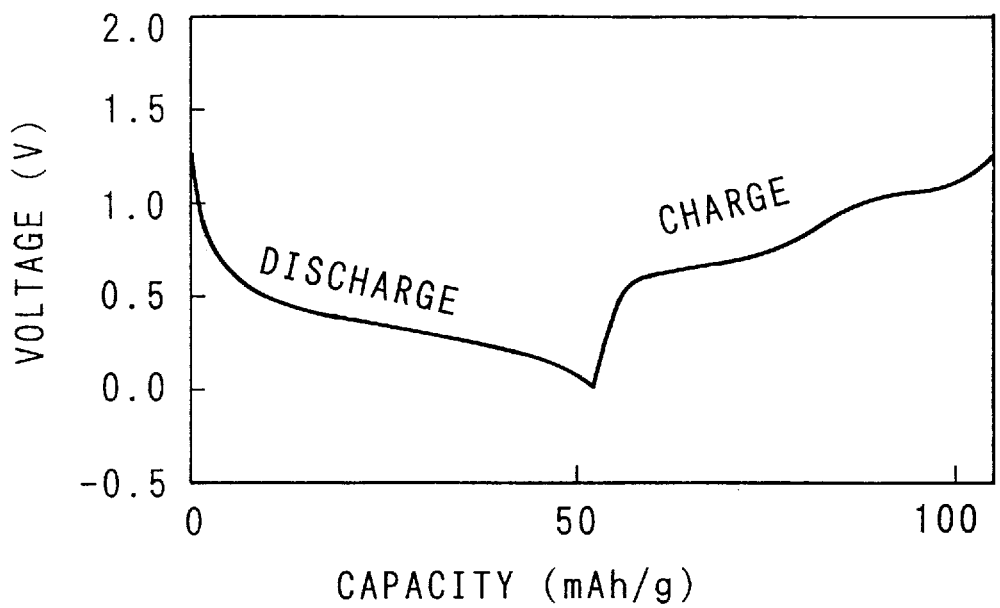
FIG. 21 is a graph showing a charge-discharge curve for a second cycle of a test cell wherein $Li_{1.15}Co_{0.5}N$ of example 21 is used for the working electrode.

As is clear from FIG. 21, with this $Li_{1.15}Cu_{0.4}N$ also, reversible insertion and extraction of the lithium ions was possible within the voltage range from 0.0–1.3 V. Steady charging and discharging was repeated for more than 50 cycles without observing any accompanying sudden drop in capacity. A capacity of 58 mAh was obtained under this steady repetition of the charging and discharging, and converting this to capacity per weight of negative electrode active material container of the working electrode, gives a capacity ratio of 785 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 22

A test cell was made with the $LiCo_{0.5}N$ in example 20 replaced by $Li_{1.24}Co_{0.5}N$ synthesized by an electrochemical reaction so as to give the amorphous form. Tests were carried out under charge-discharge conditions with a voltage range from 0.0–1.2 V and a current of 1 mA. The charge-discharge curve for the second cycle is shown in FIG. 22.

Figure 22:
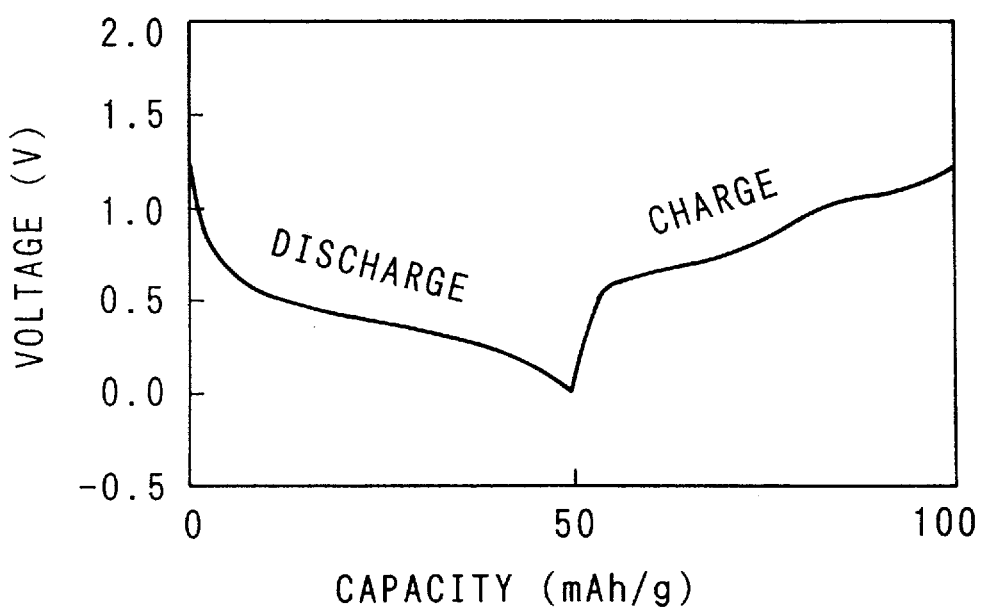
FIG. 22 is a graph showing a charge-discharge curve for a second cycle of a test cell wherein $Li_{1.24}Co_{0.5}N$ of example 22 is used for the working electrode.

As is clear from FIG. 22, with this $Li_{1.24}Co_{0.5}N$ also, reversible insertion and extraction of the lithium ions was possible within the voltage range from 0.0–1.2 V. Steady charging and discharging was repeated for more than 50 cycles without observing any accompanying sudden drop in capacity. A capacity of 50 mAh was obtained under this steady repetition of the charging and discharging, and converting this to capacity per weight of negative electrode active material container of the working electrode, gives a capacity ratio of 750 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 23

A test cell was made with the $LiCo_{0.5}N$ in example 20 replaced by $Li_{1.05}Co_{0.4}N$ synthesized by a chemical reaction so as to give the amorphous form. Tests were carried out under charge-discharge conditions with a voltage range from 0.0–1.2 V and a current of 1 mA. The charge-discharge curve for the second cycle is shown in FIG. 23.

Figure 23:
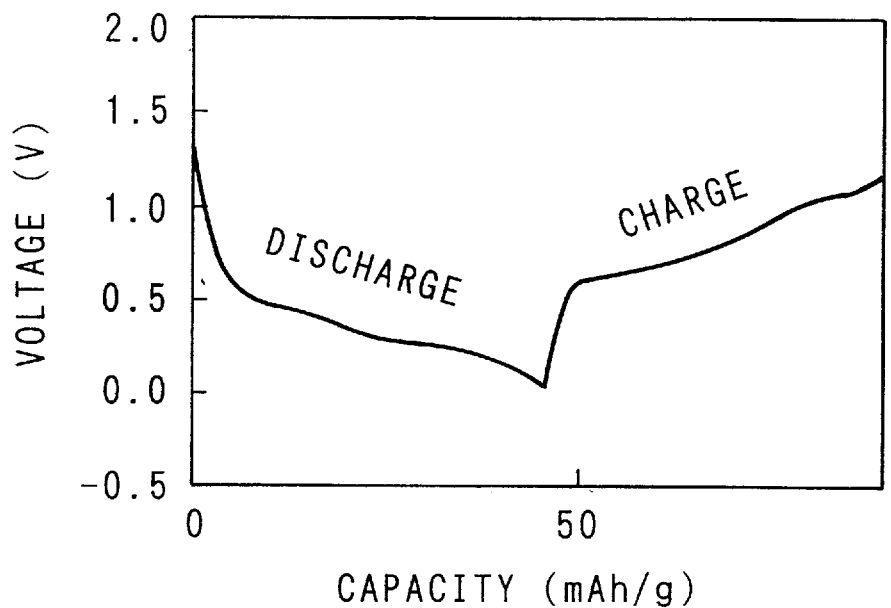
FIG. 23 is a graph showing a charge-discharge curve for a second cycle of a test cell wherein $Li_{1.05}Co_{0.4}N$ of example 23 is used for the working electrode.

As is clear from FIG. 23, with this $Li_{1.05}Co_{0.4}N$ also, reversible insertion and extraction of the lithium ions was possible within the voltage range from 0.0–1.2 V. Steady charging and discharging was repeated for more than 50 cycles without observing any accompanying sudden drop in capacity. A capacity of 46 mAh was obtained under this steady repetition of the charging and discharging, and converting this to capacity per weight of negative electrode active material container of the working electrode, gives a capacity ratio of 850 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 24

A test cell was made with the $LiCo_{0.5}N$ in example 20 replaced by $Li_{0.96}Co_{0.4}N$ synthesized by an electrochemical reaction so as to give the amorphous form. Tests were carried out under charge-discharge conditions with a voltage range from 0.0–1.4 V and a current of 1 mA. The charge-discharge curve for the second cycle is shown in FIG. 24.

Figure 24:
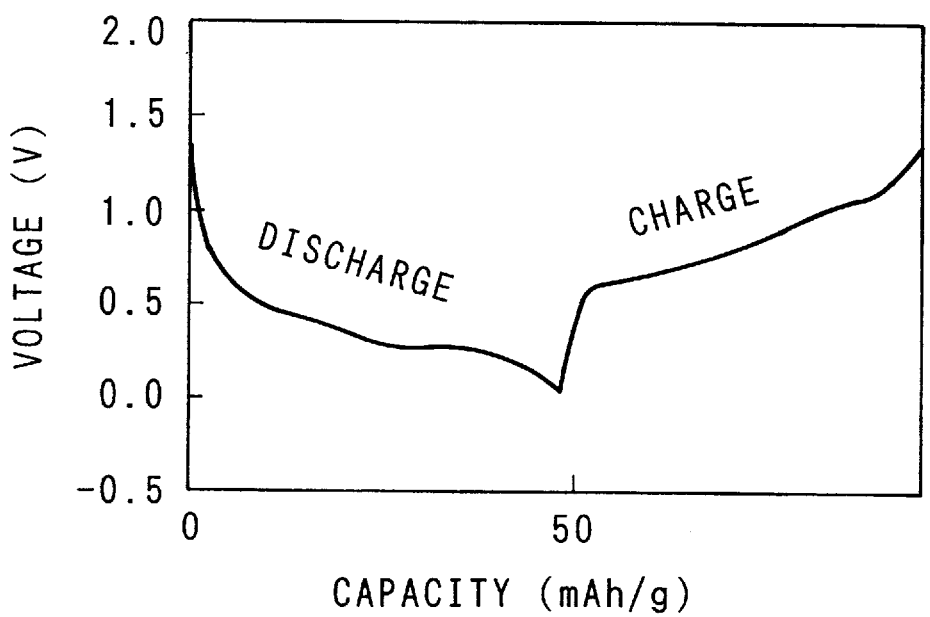
FIG. 24 is a graph showing a charge-discharge curve for a second cycle of a test cell wherein $Li_{0.96}Co_{0.4}N$ of example 24 is used for the working electrode.

As is clear from FIG. 24, with this $Li_{0.96}Co_{0.4}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 48 mAh was obtained under this steady repetition of the charging and discharging, and converting this to capacity per weight of negative electrode active material container of the working electrode, gives a capacity ratio of 890 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed

21 with an X-ray diffraction apparatus, however no lithium metal X-ray diffraction pattern could be found.

EXAMPLE 25

A test cell was made with the $LiCo_{0.5}N$ in example 20 replaced by $Li_{0.95}Co_{0.6}N$ synthesized by an electrochemical reaction so as to give the amorphous form. Tests were carried out under charge-discharge conditions with a voltage range from 0.0–1.4 V and a current of 1 mA. The charge-discharge curve for the second cycle is shown in FIG. 25.

Figure 25:
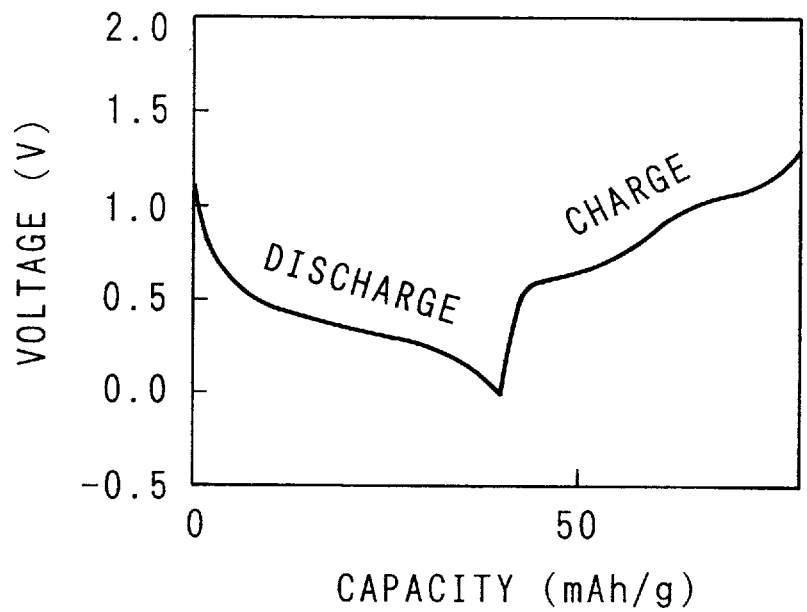
FIG. 25 is a graph showing a charge-discharge curve for a second cycle of a test cell wherein $Li_{0.95}Co_{0.6}N$ of example 25 is used for the working electrode.

As is clear from FIG. 25, with this $Li_{0.95}Co_{0.6}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 39 mAh was obtained under this steady repetition of the charging and discharging, and converting this to capacity per weight of negative electrode active material container of the working electrode, gives a capacity ratio of 720 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 26

A test cell was made with the $LiCo_{0.5}N$ in example 20 replaced by $Li_{1.5}Ni_{0.5}N$ synthesized by an electrochemical reaction so as to give the amorphous form. Tests were carried out under the same charge-discharge conditions as for example 20. The charge-discharge curve for the second cycle is shown in FIG. 26.

Figure 26:
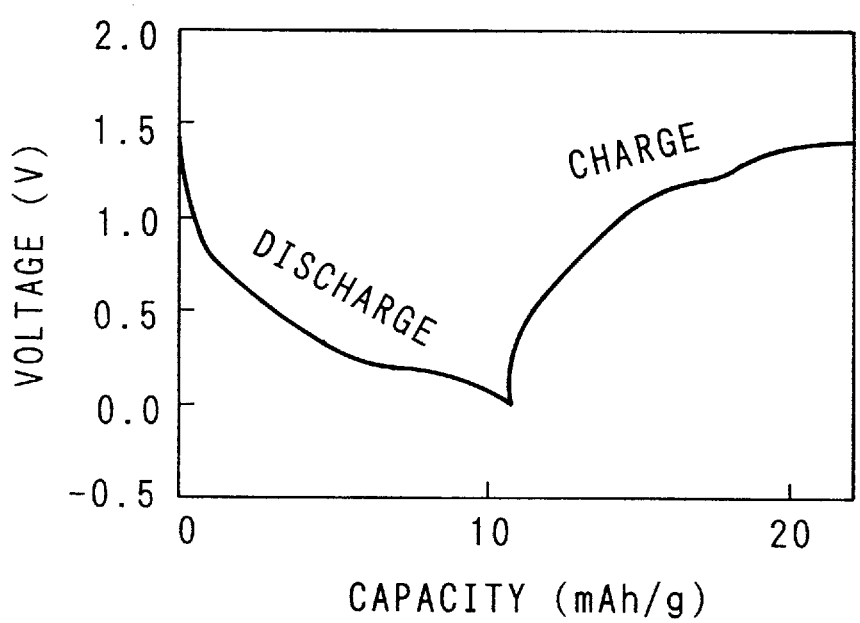
FIG. 26 is a graph showing a charge-discharge curve for a second cycle of a test cell wherein $Li_{1.5}Ni_{0.5}N$ of example 26 is used for the working electrode.

As is clear from FIG. 26, with this $Li_{1.5}Ni_{0.5}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 11 mAh was obtained under this steady repetition of the charging and discharging, and converting this to capacity per weight of negative electrode active material container of the working electrode, gives a capacity ratio of 175 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 27

A test cell was made with the $LiCo_{0.5}N$ in example 20 replaced by $Li_{1.09}Cu_{0.4}N$ synthesized by an electrochemical reaction so as to give the amorphous form. Tests were carried out under the same charge-discharge conditions as for example 20. The charge-discharge curve for the second cycle is shown in FIG. 27.

Figure 27:
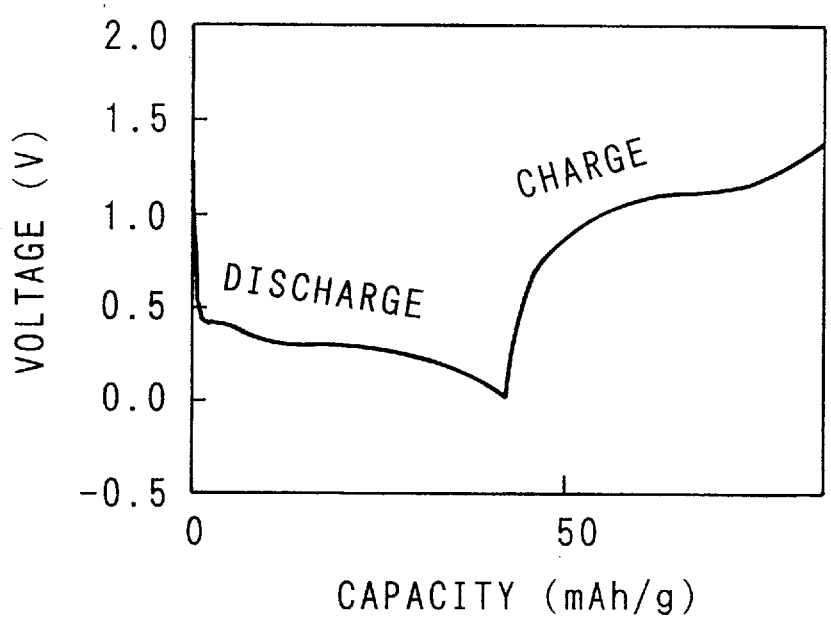
FIG. 27 is a graph showing a charge-discharge curve for a second cycle of a test cell wherein $Li_{1.09}Cu_{0.4}N$ of example 27 is used for the working electrode.

As is clear from FIG. 27, with this $Li_{1.09}Cu_{0.4}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 42 mAh was obtained under this steady repetition of the charging and discharging, and converting this to capacity per weight of negative electrode active material container of the working electrode, gives a capacity ratio of 723 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 28

With $LiCo_{0.4}Fe_{0.1}N$ synthesized by a chemical reaction so as to give the amorphous-form, a measured diffraction pattern was measured using an X-ray powder diffraction apparatus. Copper was used in the tube of the X-ray diffraction apparatus, and measurements were made at a tube voltage of 30 kV and a tube current of 100 mA.

Figure 28:
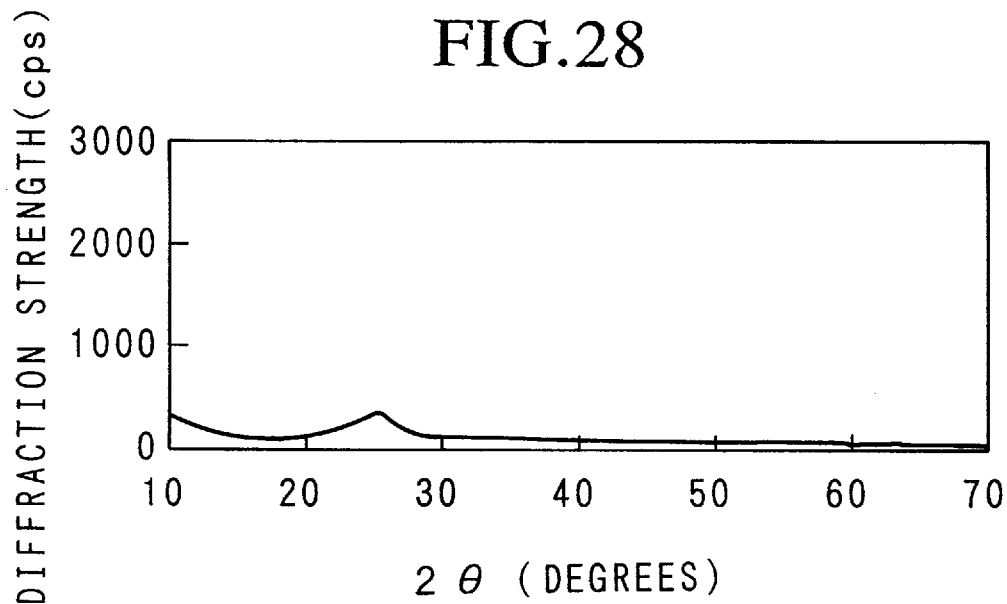
FIG. 28 is a graph showing an X-ray diffraction pattern of $LiCo_{0.4}Fe_{0.1}N$ of example 28.

As shown in FIG. 28, with this $LiCo_{0.4}Fe_{0.1}N$, a broad peak is observed in the vicinity of $2\theta=25°$. However in the range for $2\theta$ from 10–70 degrees, except for this peak there is no evidence of a diffraction peak, thus verifying this $LiCo_{0.4}Fe_{0.1}N$ to be amorphous.

Using the test cell shown in FIG. 3 and described in example 3, with the $LiCo_{0.4}Fe_{0.1}N$, charge-discharge tests were carried out with a voltage range from 0.0–1.4 V and a current of 1 mA. The charge-discharge curve for the fifth cycle is shown in FIG. 29.

Figure 29:
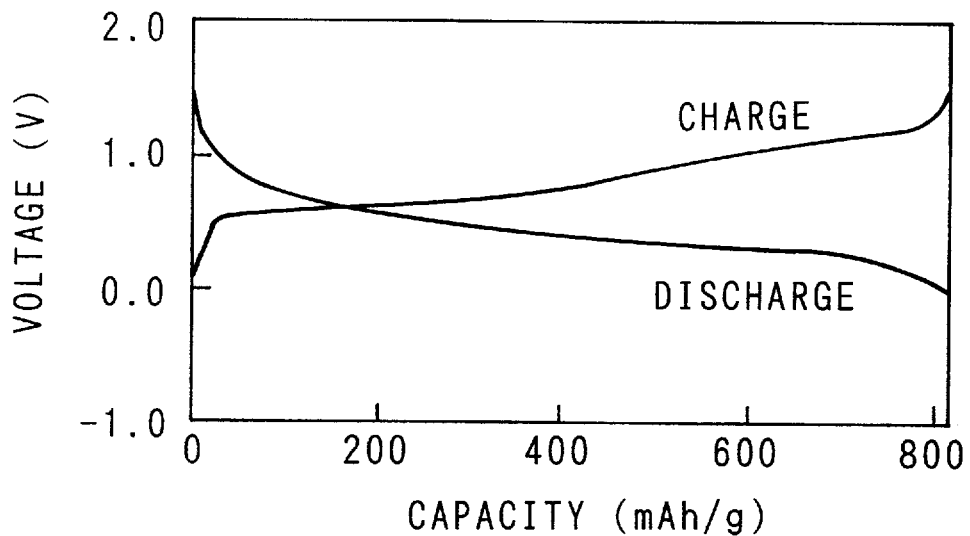
FIG. 29 is a graph showing a charge-discharge curve for a fifth cycle of a test cell wherein $LiCo_{0.4}Fe_{0.1}N$ of example 28 is used for the working electrode.

As is clear from FIG. 29, with this $LiCo_{0.4}Fe_{0.1}N$, reversible insertion and extraction of the lithium ions was possible within the voltage range from 0.0–1.4 V. Steady charging and discharging was repeated for more than 50 cycles without observing any accompanying sudden drop in capacity. A capacity of 54 mAh was obtained under this steady repetition of the charging and discharging, and converting this to capacity per weight of negative electrode active material container of the working electrode, gives a capacity ratio of 810 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern was found.

EXAMPLE 29

Figure 30:
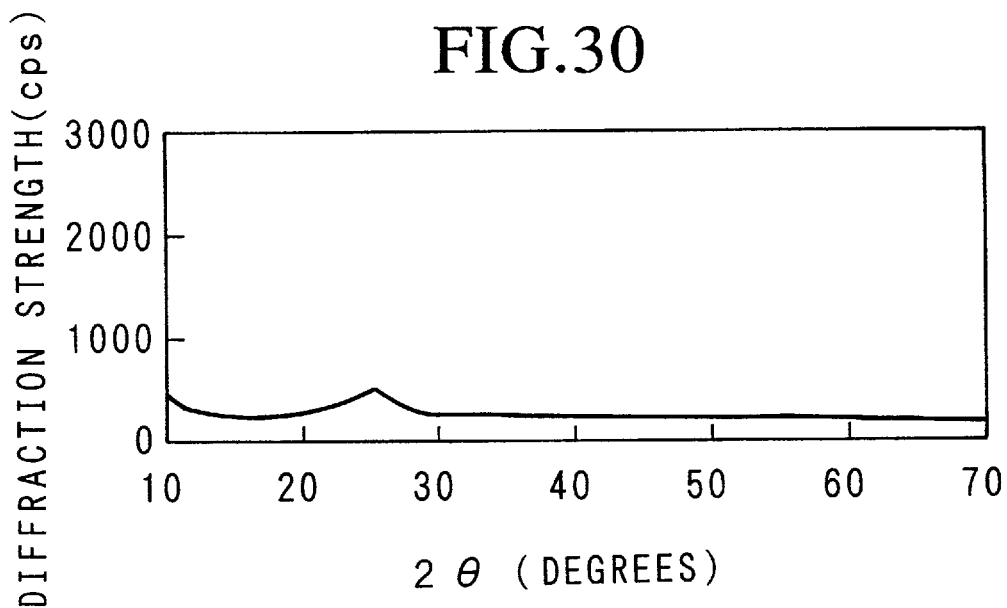
FIG. 30 is a graph showing an X-ray diffraction pattern of $LiCo_{0.4}Ni_{0.1}N$ of example 29.

FIG. 30 shows a diffraction pattern measured using an X-ray powder diffraction apparatus, of $LiCo_{0.4}Ni_{0.1}N$ synthesized by a chemical reaction so as to give the amorphous form. Copper was used in the tube of the X-ray diffraction apparatus, and measurements were made at a tube voltage of 30 kV and a tube current of 100 mA. With this $LiCo_{0.4}Ni_{0.1}N$, a broad peak is observed in the vicinity of $2\theta=25°$. However in the range for $2\theta$ from 10–70 degrees, except for this peak there is no evidence of a diffraction peak, thus verifying this $LiCo_{0.4}Ni_{0.1}N$ to be amorphous.

A test cell was then made with the $LiCo_{0.4}Fe_{0.1}N$ in example 28 replaced by this $LiCo_{0.4}Ni_{0.1}N$, and tests were carried out under charge-discharge conditions with a voltage range from 0.0–1.4 V and a current of 1 mA. The charge-discharge curve for the fifth cycle is shown in FIG. 31.

Figure 31:
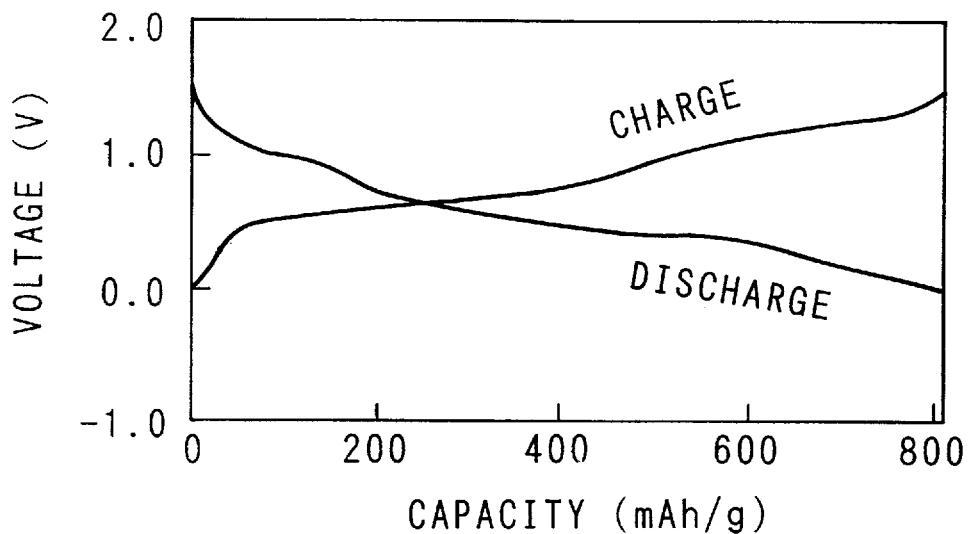
FIG. 31 is a graph showing a charge-discharge curve for a fifth cycle of a test cell wherein $LiCo_{0.4}Ni_{0.1}N$ of example 29 is used for the working electrode.

As is clear from FIG. 31, with this $LiCo_{0.4}Ni_{0.1}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 53 mAh was obtained under this steady repetition of the charging and discharging, and converting this to capacity per weight of negative electrode active mate rial container of the working electrode, gives a capacity ratio of 810 mAh/g.

On completion of the charge-discharge tests, the test cell was disassembled and the working electrode surface examined with an SEM. However there was no evidence of lithium metal deposits or dendrite growth on the working electrode surface.

The working electrode was also analyzed with an X-ray diffraction apparatus, however no lithium metal X-ray diffraction pattern could be found.

EXAMPLE 30

With $Li_{1.1}Co_{0.2}Ni_{0.2}N$ synthesized by a chemical reaction so as to give the amorphous form, a diffraction pattern was measured using an X-ray powder diffraction apparatus. A broad peak was observed in the vicinity of $2\theta=25°$. However in the range for $2\theta$ from 10–70 degrees, except for this peak there is no evidence of a diffraction peak, thus verifying this $Li_{1.1}Co_{0.2}Ni_{0.2}N$ to be amorphous.

A test cell was then made as before with the $LiCo_{0.4}Fe_{0.1}N$ in example 28 replaced by this $Li_{1.1}Co_{0.2}Ni_{0.2}N$, and tests were carried out under charge-discharge conditions with a voltage range from 0.0–1.3 V and a current of 1 mA.

With this $Li_{1.1}Co_{0.2}Ni_{0.2}N$ also, reversible insertion and extraction of the lithium ions was possible. Steady charging and discharging was repeated for more than 50 cycles without observing any accompanying sudden drop in capacity. A capacity of 45 mAh was obtained under this steady repetition of the charging and discharging, and converting this to capacity per weight of negative electrode active material container of the working electrode, gives a capacity ratio of 680 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 31

With $LiCo_{0.4}Mn_{0.1}N$ synthesized by an electrochemical reaction so as to give the amorphous form, a diffraction pattern was measured using an X-ray powder diffraction apparatus. Her e a broad peak was observed in the vicinity of $2\theta=25°$. However in the range for $2\theta$ from 10–70 degrees, except for this peak there is no evidence of a diffraction peak, thus verifying this $LiCo_{0.4}Mn_{0.1}N$ to be amorphous.

A test c ell was then made as before with the $LiCo_{0.4}Fe_{0.1}N$ in example 28 replaced by this $LiCo_{0.4}Mn_{0.1}N$, and tests were carried out under charge-discharge conditions with a voltage range from 0.0–1.4 V and a current of 1 mA.

With this $LiCo_{0.4}Mn_{0.1}N$ also, reversible insertion and extraction of the lithium ions was possible. Steady charging and discharging was repeated for more than 50 cycles without observing any accompanying sudden drop in capacity. A capacity of 50 mAh was obtained under this steady repetition of the charging and discharging, and converting this to capacity per weight of negative electrode active material container of the working electrode, gives a capacity ratio of 780 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 32

With $LiCo_{0.4}Cu_{0.1}N$ synthesized by a chemical reaction so as to give the amorphous form, a diffraction pattern was measured using an X-ray powder diffraction apparatus. Copper was used in the tube of the X-ray diffraction apparatus, and measurements were made at a tube voltage of 30 kV and a tube current of 100 mA.

Figure 32:
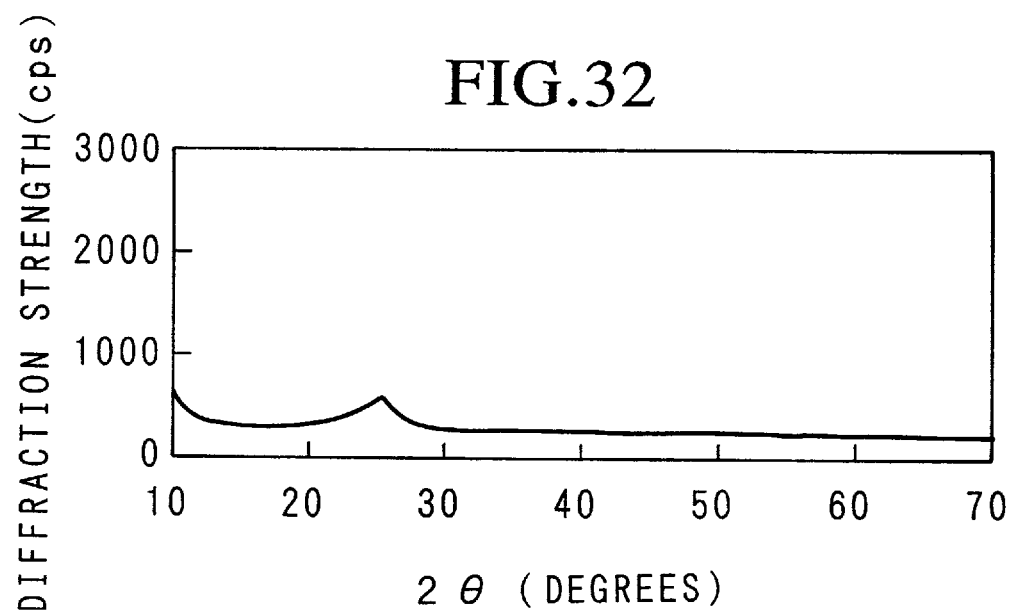
FIG. 32 is a graph showing an X-ray diffraction pattern of $LiCo_{0.4}Cu_{0.1}N$ of example 32.

As shown in FIG. 32, with this $LiCo_{0.4}Cu_{0.1}N$, a broad peak was observed in the vicinity of $2\theta=25°$. However in the range for $2\theta$ from 10–70 degrees, except for this peak there is no evidence of a diffraction peak, thus verifying this $LiCo_{0.4}Cu_{0.1}N$ to be amorphous.

A test cell was then made as before with the $LiCo_{0.4}Fe_{0.1}N$ in example 28 replaced by this $LiCo_{0.4}Cu_{0.1}N$, and tests were carried out under charge-discharge conditions with a voltage range from 0.0–1.4 V and a current of 1 mA. The charge-discharge curve for the fifth cycle is shown in FIG. 33.

Figure 33:
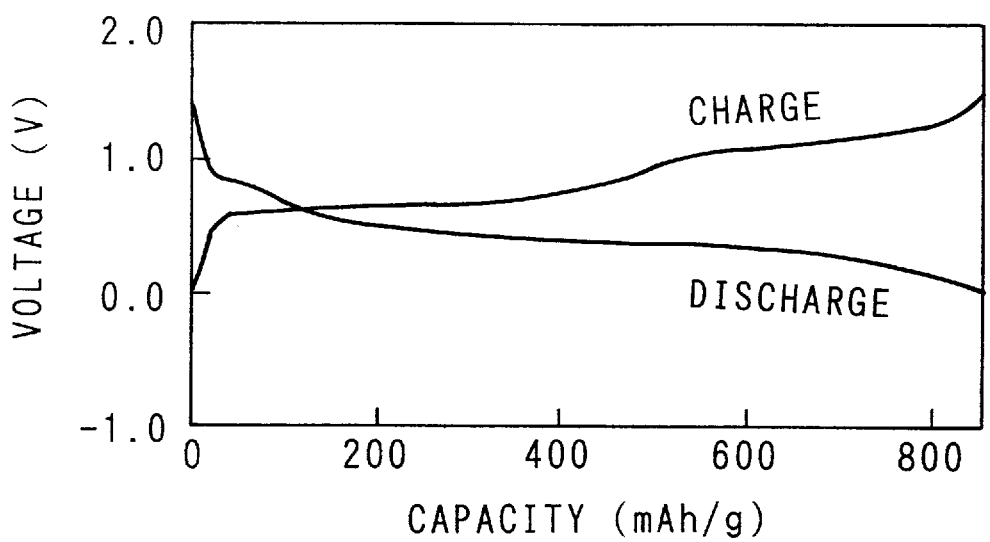
FIG. 33 is a graph showing a charge-discharge curve for a fifth cycle of a test cell wherein $LiCo_{0.4}Cu_{0.4}N$ of example 32 is used for the working electrode.

As is clear from FIG. 33, with this $LiCo_{0.4}Cu_{0.1}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 58 mAh was obtained under this steady repetition of the charging and discharging, and converting this to capacity per weight of negative electrode active material container of the working electrode, gives a capacity ratio of 860 mAh/g.

On completion of the charge-discharge tests, the test cell was disassembled and the working electrode surface examined with an SEM. However there was no evidence of lithium metal deposits or dendrite growth on the working electrode surface.

The working electrode was also analyzed with an X-ray diffraction apparatus, however no lithium metal X-ray diffraction pattern could be found.

EXAMPLE 33

With $LiCo_{0.1}Cu_{0.4}N$ synthesized by a chemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there is no evidence of a diffraction peak, thus verifying this $LiCo_{0.1}Cu_{0.4}N$ to be amorphous.

A test cell was then made as before with the $LiCo_{0.1}Fe_{0.1}N$ in example 28 replaced by this $LiCo_{0.1}Cu_{0.4}N$, and tests were carried out under charge-discharge conditions with a voltage range from 0.0–1.4 V and a current of 1 mA. The charge-discharge curve for the fifth cycle is shown in FIG. 34.

Figure 34:
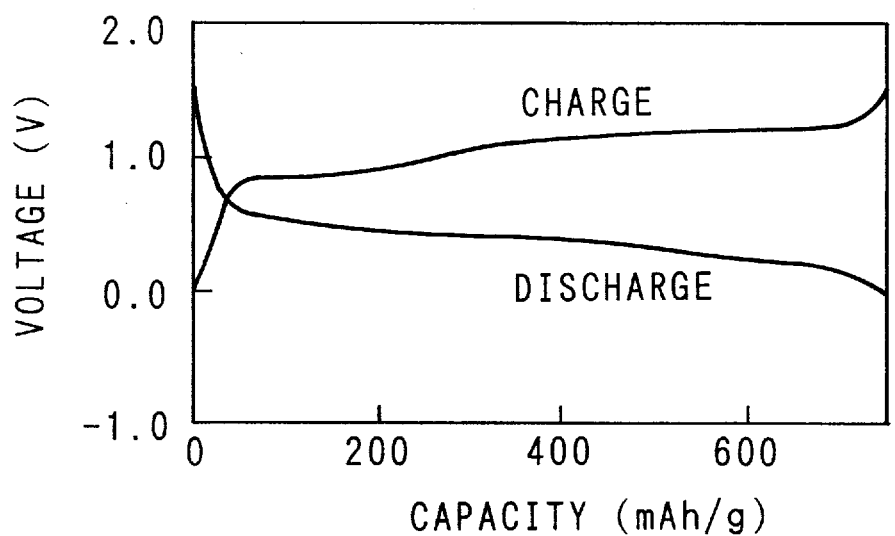
FIG. 34 is a graph showing a charge-discharge curve for a fifth cycle of a test cell wherein $LiCo_{0.1}Cu_{0.4}N$ of example 33 is used for the working electrode.

As is clear from FIG. 34, with this $LiCo_{0.1}Cu_{0.4}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 50 mAh was obtained under this steady repetition of the charging and discharging, and converting this to capacity per weight of negative electrode active material container of the working electrode, gives a capacity ratio of 770 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 34

With $Li_{1.2}Co_{0.2}Cu_{0.2}N$ synthesized by a chemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there is no evidence of a diffraction peak, thus verifying this $Li_{1.2}Co_{0.2}Cu_{0.2}N$ to be amorphous.

A test cell was then made as before with the $LiCo_{0.4}Fe_{0.1}N$ in example 28 replaced by this $Li_{1.2}Co_{0.2}Cu_{0.2}N$, and tests were carried out under charge-discharge conditions with a voltage range from 0.0–1.2 V and a current of 1 mA.

With this $Li_{1.2}Co_{0.2}Cu_{0.2}N$ also, reversible insertion and extraction of the lithium ions was possible. Steady charging and discharging was repeated for more than 50 cycles without observing any accompanying sudden drop in capacity. A capacity of 46 mAh was obtained under this steady repetition of the charging and discharging, and converting this to capacity per weight of negative electrode active material container of the working electrode, gives a capacity ratio of 850 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 35

With $LiCo_{0.4}Zn_{0.1}N$ synthesized by an electrochemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiCo_{0.4}Zn_{0.1}N$ to be amorphous.

A test cell was then made as before with the $LiCo_{0.4}Fe_{0.1}N$ in example 28 replaced by this $LiCo_{0.4}Zn_{0.1}N$, and tests were carried out under charge-discharge conditions with a voltage range from 0.0–1.4 V and a current of 1 mA.

With this $LiCo_{0.4}Zn_{0.1}N$ also, reversible insertion and extraction of the lithium ions was possible. Steady charging and discharging was repeated for more than 50 cycles without observing any accompanying sudden drop in capacity. A capacity of 44 mAh was obtained under this steady repetition of the charging and discharging, and converting this to capacity per weight of negative electrode active material container of the working electrode, gives a capacity ratio of 660 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 36

With $LiNi_{0.4}Fe_{0.1}N$ synthesized by an electrochemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiNi_{0.4}Fe_{0.1}N$ to be amorphous.

A test cell was then made as before with the $LiCo_{0.4}Fe_{0.1}N$ in example 28 replaced by this $LiNi_{0.4}Fe_{0.1}N$, and tests were carried out under charge-discharge conditions with a voltage range from 0.0–1.4 V and a current of 1 mA.

With this $LiNi_{0.4}Fe_{0.1}N$ also, reversible insertion and extraction of the lithium ions was possible. Steady charging and discharging was repeated for more than 50 cycles without observing any accompanying sudden drop in capacity. A capacity of 45 mAh was obtained under this steady repetition of the charging and discharging, and converting this to capacity per weight of negative electrode active material container of the working electrode, gives a capacity ratio of 680 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 37

With $LiNi_{0.4}Mn_{0.1}N$ synthesized by an electrochemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiNi_{0.4}Mn_{0.1}N$ to be amorphous.

A test cell was then made as before with the $LiCo_{0.4}Fe_{0.1}N$ in example 28 replaced by this $LiNi_{0.4}Mn_{0.1}N$, and tests were carried out under charge-discharge conditions with a voltage range from 0.0–1.4 V and a current of 1 mA.

With this $LiNi_{0.4}Mn_{0.1}N$ also, reversible insertion and extraction of the lithium ions was possible. Steady charging and discharging was repeated for more than 50 cycles without observing any accompanying sudden drop in capacity. A capacity of 38 mAh was obtained under this steady repetition of the charging and discharging, and converting this to capacity per weight of negative electrode active material container of the working electrode, gives a capacity ratio of 650 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 38

With $LiNi_{0.4}Cu_{0.1}N$ synthesized by an electrochemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiNi_{0.4}Cu_{0.1}N$ to be amorphous.

A test cell was then made as before with the $LiCo_{0.4}Fe_{0.1}N$ in example 28 replaced by this $LiNi_{0.4}Cu_{0.1}N$, and tests were carried out under charge-discharge conditions with a voltage range from 0.0–1.4 V and a current of 1 mA.

With this $LiNi_{0.4}Cu_{0.1}N$ also, reversible insertion and extraction of the lithium ions was possible. Steady charging and discharging was repeated for more than 50 cycles without observing any accompanying sudden drop in capacity. A capacity of 45 mAh was obtained under this steady repetition of the charging and discharging, and converting this to capacity per weight of negative electrode active material container of the working electrode, gives a capacity ratio of 700 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 39

With $LiNi_{0.1}Cu_{0.4}N$ synthesized by an electrochemical reaction so as to give the amorphous form, a diffraction pattern was measured using an X-ray powder diffraction apparatus. Copper was used in the tube of the X-ray diffraction apparatus, and measurements were made at a tube voltage of 30 kV and a tube current of 100 mA.

Figure 35:
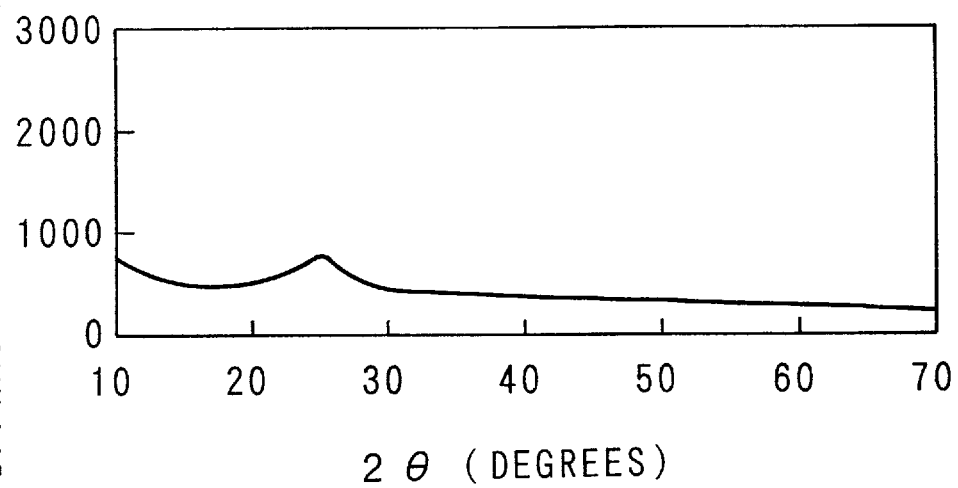
FIG. 35 is a graph showing an X-ray diffraction pattern of LiNi$_{0.1}$Cu$_{0.4}$N of example 39.

As shown in FIG. 35, with this $LiNi_{0.1}Cu_{0.4}N$, a broad peak was observed in the vicinity of $2\theta=25°$. However in the range for $2\theta$ from 10–70 degrees, except for this peak there is no evidence of a diffraction peak, thus verifying this $LiNi_{0.1}Cu_{0.4}N$ to be amorphous.

A test cell was then made as before with the $LiCo_{0.4}Fe_{0.1}N$ in example 28 replaced by this $LiNi_{0.1}Cu_{0.4}N$, and tests were carried out under charge-discharge conditions with a voltage range from 0.0–1.4 V and a current of 1 mA. The charge-discharge curve for the fifth cycle is shown in FIG. 36.

Figure 36:
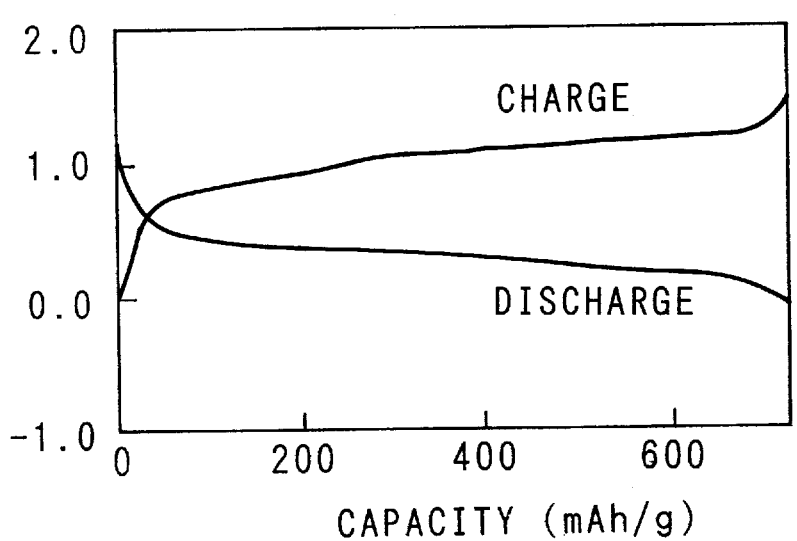
FIG. 36 is a graph showing a charge-discharge curve for a fifth cycle of a test cell wherein LiNi$_{0.1}$Cu$_{0.4}$N of example 39 is used for the working electrode.

As is clear from FIG. 36, with this $LiNi_{0.1}Cu_{0.4}N$ also, reversible insertion and extraction of the lithium ions was possible within the voltage range from 0.0–1.4 V. Steady charging and discharging was repeated for more than 50 cycles without observing any accompanying sudden drop in capacity. A capacity of 48 mAh was obtained under this steady repetition of the charging and discharging, and converting this to capacity per weight of negative electrode active material container of the working electrode, gives a capacity ratio of 720 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 40

With $LiCu_{0.4}Fe_{0.1}N$ synthesized by an electrochemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiCu_{0.4}Fe_{0.1}N$ to be amorphous.

A test cell was then made as before with the $LiCo_{0.4}Fe_{0.1}N$ in example 28 replaced by this $LiCu_{0.4}Fe_{0.1}N$, and tests were carried out under charge-discharge conditions with a voltage range from 0.0–1.4 V and a current of 1 mA.

With this $LiCu_{0.4}Fe_{0.1}N$ also, reversible insertion and extraction of the lithium ions was possible. Steady charging and discharging was repeated for more than 50 cycles without observing any accompanying sudden drop in capacity. A capacity of 43 mAh was obtained under this steady repetition of the charging and discharging, and converting this to capacity per weight of negative electrode active material container of the working electrode, gives a capacity ratio of 680 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 41

With $LiCu_{0.4}Mn_{0.1}N$ synthesized by an electrochemical reaction so as to give the amorphous form, a diffraction patter n was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiCu_{0.4}Mn_{0.1}N$ to be amorphous.

A test cell was then made as before with the $LiCo_{0.4}Fe_{0.1}N$ in example 28 replaced by this $LiCu_{0.4}Mn_{0.1}N$, and tests were carried out under charge-discharge conditions with a voltage range from 0.0–1.4 V and a current of 1 mA.

With this $LiCu_{0.4}Mn_{0.1}N$ also, reversible insertion and extraction of the lithium ions was possible. Steady charging and discharging was repeated for more than 50 cycles without observing any accompanying sudden drop in capacity. A capacity of 40 mAh was obtained under this steady repetition of the charging and discharging, and converting this to capacity per weight of negative electrode active material container of the working electrode, gives a capacity ratio of 630 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 42

With $LiCu_{0.4}Zn_{0.1}N$ synthesized by an electrochemical reaction so as to give the amorphous form, a diffraction pattern was measured using an X-ray powder diffraction apparatus. From the results, a broad peak was observed in the vicinity of $2\theta=25°$. However in the range for $2\theta$ from 10–70 degrees, except for this peak there was no evidence of a diffraction peak, thus verifying this $LiCu_{0.4}Zn_{0.1}N$ to be amorphous. A test cell was then made as before with the $LiCo_{0.4}Fe_{0.1}N$ in example 28 replaced by this $LiCu_{0.4}Zn_{0.1}N$, and tests were carried out under charge-discharge conditions with a voltage range from 0.0–1.4 V and a current of 1 mA.

With this $LiCu_{0.4}Zn_{0.1}N$ also, reversible insertion and extraction of the lithium ions was possible. Steady charging and discharging was repeated for more than 50 cycles without observing any accompanying sudden drop in capacity. A capacity of 45 mAh was obtained under this steady repetition of the charging and discharging, and converting this to capacity per weight of negative electrode active material container of the working electrode, gives a capacity ratio of 700 mAh/g.

On completion of the charge-discharge tests, the test cell was disassembled and the working electrode surface examined with an SEM. However there was no evidence of lithium metal deposits or dendrite growth on the working electrode surface. The working electrode was also analyzed with an X-ray diffraction apparatus, however no lithium metal X-ray diffraction pattern could be found.

EXAMPLE 43

With the lithium secondary battery of example 1, $LiCoO_2$ was used for the positive electrode active material of the positive electrode 12. The $LiCoO_2$ was synthesized by the abovementioned baking method. Basically this involved weighing lithium nitrate and cobalt oxide according to the chemical formula. Then mixing, and baking in an oxygen atmosphere at 700° C. Apart from the positive electrode 12, components the same as for example 1 were used.

With this lithium secondary battery, charge-discharge tests were carried out with a voltage range from 2.5–4.2 V and a current of 1 mA. The capacity of this lithium secondary battery under repeated steady charging and discharging was 33 mAh. Moreover, under the steady repeated charging and discharging, a cycle life of 650 cycles was obtained.

EXAMPLE 44

With the lithium secondary battery of example 1, $Li_{0.5}MnO_2$ was used for the positive electrode active material of the positive electrode 12. The $Li_{0.5}MnO_2$ was synthesized by the abovementioned baking method. Basically this involved weighing lithium nitrate and di manganese tri oxide according to the chemical formula. Then mixing, and baking in an oxygen atmosphere at 700° C. Apart from the positive electrode 12, components the same as for example 1 were used.

Figure 37:
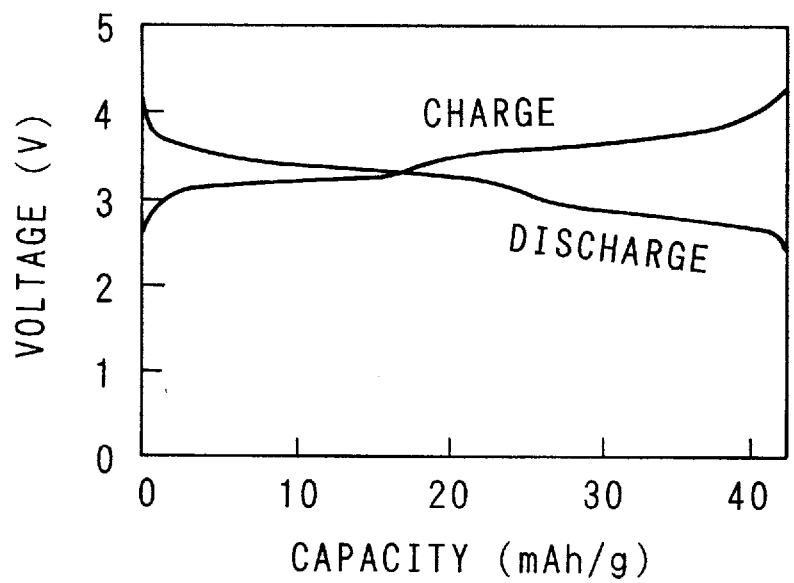
FIG. 37 is a graph showing a charge-discharge curve for a fourth cycle of a lithium secondary battery according to example 44.

With this lithium secondary battery, charge-discharge tests were carried out with a voltage range from 2.5–4.2 V and a current of 1 mA. FIG. 37 shows the charge-discharge curve for the fourth cycle.

As is clear from FIG. 37, a capacity of 30 mAh was obtained. Moreover, this lithium secondary battery also was subjected to steady repeated charging and discharging, giving a cycle life of 570 cycles.

EXAMPLE 45

With the lithium secondary battery of example 12, $LiCoO_2$ was used for the positive electrode active material of the positive electrode 12. The $LiCoO_2$ was synthesized by the abovementioned baking method. Basically this involved weighing lithium nitrate and cobalt oxide according to the chemical formula. Then mixing, and baking in an oxygen atmosphere at 700° C. Apart from the positive electrode 12, components the same as for example 12 were used.

With this lithium secondary battery, charge-discharge tests were carried out with a voltage range from 2.5–4.2 V and a current of 1 mA. The capacity of this lithium secondary battery under repeated steady charging and discharging was 30 mAh. Moreover, under the steady repeated charging and discharging, a cycle life of 580 cycles was obtained.

EXAMPLE 46

Figure 38:
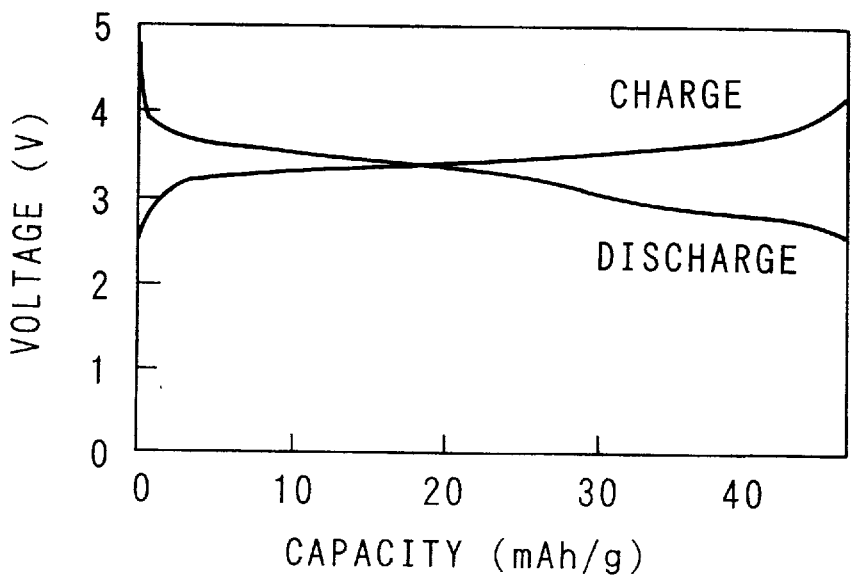
FIG. 38 is a graph showing a charge-discharge curve for a fourth cycle of a lithium secondary battery according to example 46.

With the lithium secondary battery of example 1, a solution of 1 mole/liter of $LiClO_4$ dissolved in a mixture solvent of EC and DMC (in a volumetric ratio of 1:1) was used for the nonaqueous electrolyte 3. Apart from the nonaqueous electrolyte, components the same as for example 1 were used. With this lithium secondary battery also, charge-discharge tests were carried out with a voltage range from 2.5–4.2 V and a current of 1 mA. FIG. 38 shows the charge-discharge curve for the fourth cycle.

As is clear from FIG. 38, a capacity of 31 mAh was obtained. Moreover, this lithium secondary battery also was subjected to steady repeated charging and discharging, giving a cycle life of 480 cycles.

EXAMPLE 47

With the lithium secondary battery of example 1, $Li_{1.5}Co_{0.4}N$ made by the abovementioned sputtering method was used for the negative electrode active material container of the negative electrode 2. A standard high frequency sputtering apparatus was used with a sintered body of chemical formula $Li_{2.6}Co_{0.4}N$ as a target, and a 16 mm diameter stainless steel plate as a base plate. After evacuating the chamber, Ar gas was introduced, and the high frequency sputtering apparatus operated with a power of 200 watts and with the Ar gas atmosphere at a pressure of 1 Pa, so that a thin film of amorphous $Li_{1.5}Cu_{0.4}N$ was formed on the stainless base plate, giving the negative electrode 2. The resultant thin film thickness was 5 microns. This negative electrode 2 was then spot welded to the negative electrode case 9.

On the other hand, $Li_{0.5}MnO_2$ made by the abovementioned sputtering method was used for the positive electrode active material of the positive electrode 12. A standard high frequency sputtering apparatus was used with a sintered body of chemical composition $Li_{0.5}MnO_2$ as a target, and a 16 mm diameter stainless steel plate as a base plate. After evacuating the chamber, a mixture of Ar and $O_2$ gas was introduced, and the high frequency sputtering apparatus operated with a power of 200 watts and with the atmosphere of the Ar and $O_2$ gas at a pressure of 1 Pa, so that a thin film of amorphous $Li_{0.5}MnO_2$ was formed on the stainless steel base plate. This thin film was then annealed at 700° C. in an atmosphere of oxygen, thus giving the positive electrode 12.

The resultant thin film thickness was 35 microns. This positive electrode 12 was then spot welded to the positive electrode case 11. Apart from the negative electrode 2 and the positive electrode 12, components the same as for example 1 were used.

With this lithium secondary battery, charge-discharge tests were carried out with a voltage range from 2.5–4.2 V and a current of 1 mA, and in spite of the negative electrode being extremely thin, steady charging and discharging could be repeatedly carried out. The capacity at this time was 1.6 mAh. Moreover, with this lithium secondary battery also, under steady repeated charging and discharging, a cycle life of 800 cycles was obtained.

Due to the extremely thin positive and negative electrodes of this lithium secondary battery, the overall size of the battery can be made thin, thus lending the battery to special applications such as forming on top of an electronic substrate, to meet special thin size requirements.

EXAMPLE 48

With the lithium secondary battery of example 12, $Li_{0.5}Ni_{0.5}V_{0.5}O_2$ was used for the positive electrode active material of the positive electrode 12. The $Li_{0.5}Ni_{0.5}V_{0.5}O_2$ was synthesized by the abovementioned baking method. Basically this involved weighing lithium nitrate and nickel oxide and vanadium penta oxide according to the chemical formula. Then mixing, and baking in an oxygen atmosphere at 700° C. Apart from the positive electrode 12, components the same as for example 12 were used.

With this lithium secondary battery, charge-discharge tests were carried out with a voltage range from 2.5–4.5 V and a current of 1 mA. The capacity of this lithium secondary battery under repeated steady charging and discharging was 15 mAh. Moreover, under the steady repeated charging and discharging, a cycle life of 650 cycles was obtained.

What is claimed is:

1. A negative electrode material for use in lithium secondary batteries, said negative electrode material consisting essentially of an amorphous transition metal nitride containing lithium represented by the chemical formula $Li_{1+x}M_yN$, where M represents one or more elements selected from; a transition metal, group IIIA, group IVA, and group VA, and contains at least one of Co, Ni and Cu, x is within the range from −0.2 to 2.0, and y is greater than 0.1 and less than 0.5.

2. A negative electrode material for use in lithium secondary batteries according to claim 1, wherein said transition metal nitride containing lithium, in X-ray powder diffraction measurements with θ as an angle of diffraction, has no diffraction peak within a range from 30° to 70° by 2θ.

3. A negative electrode material for use in lithium secondary batteries according to claim 1, wherein x+y is less than 2.

4. A negative electrode material for use in lithium secondary batteries according to claim 1, wherein x is within a range from −0.2 to 0.5.

5. A lithium secondary battery comprising: a negative electrode into which lithium is inserted with charging and from which lithium is extracted with discharging; a positive electrode containing a positive electrode active material with which a reversible electrochemical reaction of lithium ions is possible; and a lithium ion conducting electrolyte; wherein the negative electrode material consists essentially of an amorphous transition metal nitride containing lithium represented by the chemical formula $Li_{1+x}M_yN$, where M represents one or more elements selected from; a transition metal, group IIIA, group IVA, and group VA, and contains at least one of Co, Ni and Cu, x is within the range from −0.2 to 2.0, and y is greater than 0.1 and less than 0.5.

6. A lithium secondary battery according to claim 5, wherein said transition metal nitride containing lithium, in X-ray powder diffraction measurements with θ as an angle of diffraction, has no diffraction peak within a range from 30° to 70° by 2θ.

7. A lithium secondary battery according to claim 5, wherein x+y is less than 2.

8. A lithium secondary battery according to claim 5, wherein x is within a range from −0.2 to 0.5.

9. A lithium secondary battery according to claim 5, wherein said positive electrode active material is a transition metal oxide containing lithium represented by the chemical formula $Li_zM'O_2$, where M' represents one element or two or more elements belonging to the transition metals, and z is within the range from 0.5 to 1.0.

10. A lithium secondary battery according to claim 9, wherein said transition metal oxide containing lithium represented by the chemical formula $Li_zM'O_2$, is one of $LiNiO_2$, $LiCoO_2$, $LiNi_{0.5}Co_{0.5}O_2$, and $Li_{0.5}MnO_2$.

11. A lithium secondary battery according to claim 9, wherein said positive electrode active material is a sulfate compound represented by the chemical formula $Li_wFe_2(SO_4)_3 (0<w\leq 2.0)$.

12. A lithium secondary battery according to claim 9, wherein said electrolyte is a nonaqueous electrolyte or an electrolyte impregnated polymer matrix.

13. A lithium secondary battery according to claim 12, wherein a solvent of said nonaqueous electrolyte or electrolyte impregnated polymer matrix contains ethylene carbonate or propylene carbonate.

14. A lithium secondary battery according to claim 13, wherein said solvent of said nonaqueous electrolyte or electrolyte impregnated polymer matrix is a mixture solvent containing ethylene carbonate or propylene carbonate, and an ester or ether of chain structure.

* * * * *